(12) United States Patent
Carvajal

(10) Patent No.: US 9,595,018 B2
(45) Date of Patent: Mar. 14, 2017

(54) SWITCH NETWORK OF CONTAINERS AND TRAILERS FOR TRANSPORTATION, STORAGE, AND DISTRIBUTION OF PHYSICAL ITEMS

(71) Applicant: Hernan Ramiro Carvajal, Berkeley, CA (US)

(72) Inventor: Hernan Ramiro Carvajal, Berkeley, CA (US)

(*) Notice: Subject to any disclaimer, the term of this patent is extended or adjusted under 35 U.S.C. 154(b) by 0 days.

(21) Appl. No.: 14/705,854

(22) Filed: May 6, 2015

(65) Prior Publication Data

US 2016/0019497 A1 Jan. 21, 2016

Related U.S. Application Data

(60) Provisional application No. 61/989,519, filed on May 6, 2014.

(51) Int. Cl.

| | |
|---|---|
| *G01C 21/00* | (2006.01) |
| *G01C 21/34* | (2006.01) |
| *G06Q 10/08* | (2012.01) |
| *G06Q 50/30* | (2012.01) |
| *G01S 5/02* | (2010.01) |
| *G01S 19/42* | (2010.01) |

(Continued)

(52) U.S. Cl.
CPC ......... *G06Q 10/0833* (2013.01); *G01C 21/34* (2013.01); *G01S 5/0294* (2013.01); *G01S 19/42* (2013.01); *G06Q 10/08* (2013.01); *G06Q 50/30* (2013.01); *H04L 67/104* (2013.01); *H04L 67/12* (2013.01); *H04W 4/027* (2013.01); *H04W 4/046* (2013.01); *H04W 64/006* (2013.01); *H04W 88/04* (2013.01)

(58) Field of Classification Search
CPC combination set(s) only.
See application file for complete search history.

(56) References Cited

U.S. PATENT DOCUMENTS 4,688,244 A * 8/1987 Hannon ................. G01C 21/22
                                                       235/375
4,750,197 A * 6/1988 Denekamp ............. G07C 5/008
                                                       235/375

(Continued)

OTHER PUBLICATIONS

International Search Report and Written Opinion mailed Sep. 29, 2015, for International Patent Application No. PCT/US15/29551 filed May 6, 2015, 12 pages.

*Primary Examiner* — Yonel Beaulieu
(74) *Attorney, Agent, or Firm* — Perkins Coie LLP

(57) ABSTRACT

Some embodiments include a transportation system implementing a network for transporting, distributing, and/or storing one or more physical items in one or more cargo containers (herein may be referred to as the "transportation network" for short). The cargo containers and relay terminals may be identified via node addresses in a network address space. The no addresses enables the transportation system to track, route, and monitor the physical items as they propagate through the transportation network. The transportation network can mimic routing protocols of telecommunication systems can facilitate different private transportation, storage and distribution companies and fleets. The transportation network can enable dynamic routing to fulfill logistic requests without wasting transportation and storage resources.

30 Claims, 13 Drawing Sheets

(51) Int. Cl.
*H04L 29/08* (2006.01)
*H04W 4/02* (2009.01)
*H04W 4/04* (2009.01)
*H04W 64/00* (2009.01)
*H04W 88/04* (2009.01)

(56) References Cited

U.S. PATENT DOCUMENTS

| | | |
|---|---|---|
| 8,560,461 B1 | 10/2013 | Tian et al. |
| 2007/0288294 A1 | 12/2007 | Olsen et al. |
| 2013/0144442 A1* | 6/2013 | Dudley ................. G05B 11/01 700/275 |
| 2013/0145460 A1* | 6/2013 | Dudley ................. F25D 29/003 726/21 |
| 2013/0232028 A1 | 9/2013 | Spremulli et al. |

\* cited by examiner

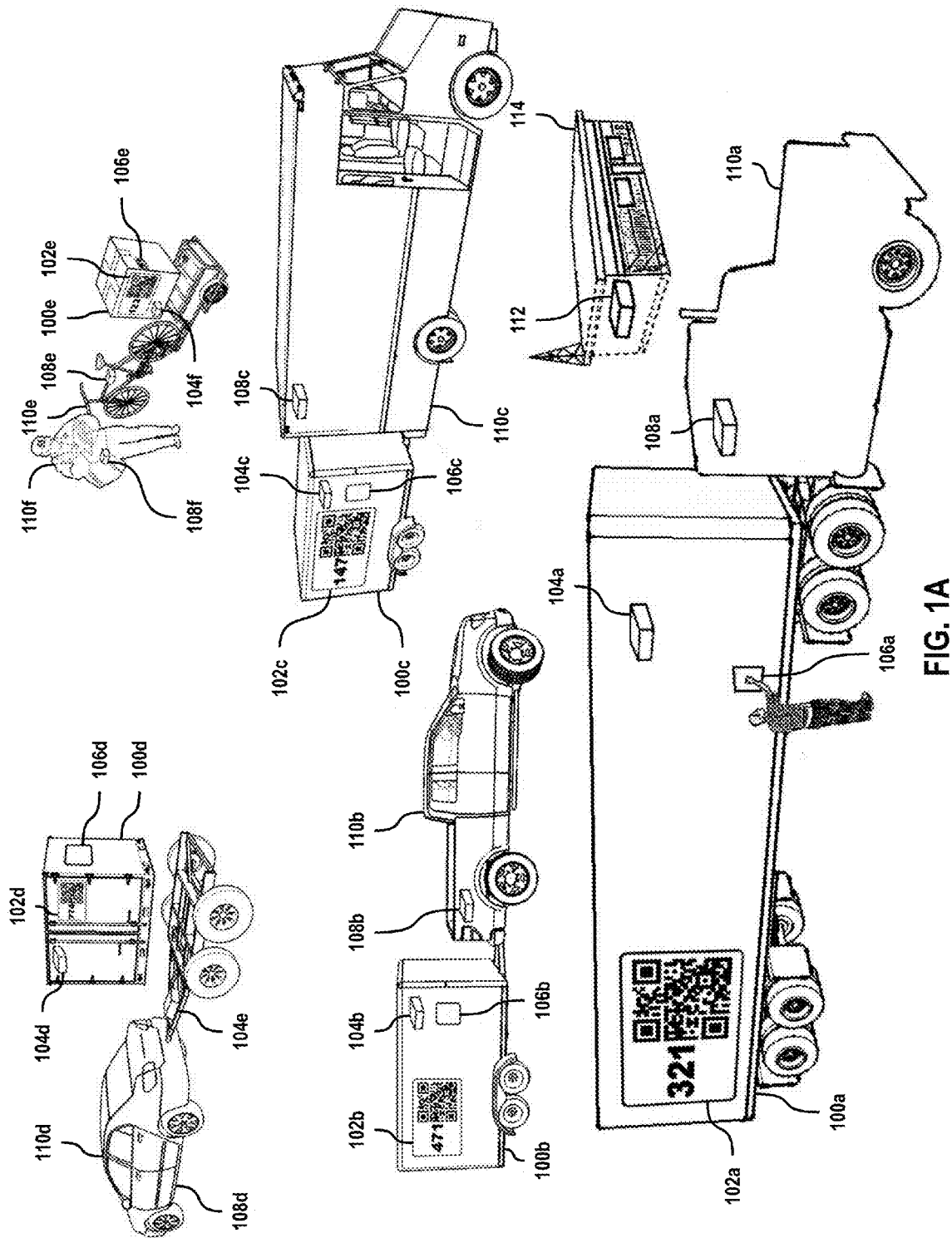

SWITCH NETWORK OF CONTAINERS AND TRAILERS FOR TRANSPORTATION, STORAGE, AND DISTRIBUTION OF PHYSICAL ITEMS

CROSS-REFERENCE TO RELATED APPLICATION(S)

This application claims the benefit of U.S. Provisional Patent Application No. 61/989,519, entitled "RED CONMUTADA DE PAQUETES Y TRAILERS PARA EL TRANSPORTE, ALMACENAMIENTO, DISTRIBUCION Y VENTA DE BIENES Y SERVICIOS," which was filed on May 6, 2014, which is incorporated by reference herein in its entirety.

BACKGROUND

In conventional transportation, transportation vehicle tows trailer from a point of origin to a final destination without driver shifts and without truck exchange. A driver often times does not return home for several days on a cross-country delivery. Conventional transportation means have a variety of inefficiencies. Individual companies, without using expensive postal services, may deliver goods from a manufacturing site to a warehouse or a warehouse to a retail store. Hence, a transportation vehicle, which moves from the point of origin to the final destination and back, is only fully utilized half of the time.

DISCLOSURE OVERVIEW

Several embodiments involve trailers and containers of different sizes and applications which enables a transportation system (e.g., a container services system that provides one or more services to transport, store, and/or distribute items from one or more cargo containers) to segment a certain amount of cargo into smaller pieces and to send them over to a final destination. The transportation system can implement a network of providers (herein referred to as the "transportation network" for short) to transport, store, and/or distribute one or more items. An original cargo can be segmented into packets and sent them over various paths and/or various terminals to the final destinations. Once there, the packets can be reassembled to reconstruct the original cargo.

In some embodiments, various cargo loads from different owners may be grouped into a single truck for efficiency. In those embodiments, a physical lock is used to secure the physical items, and a cryptographic electronic lock is used to secure tracking information associated with the physical items. The physical key and the cryptographic key can be given to the owners of the various cargo loads.

In some embodiments, trailers and containers are passively identified with printed labels (e.g., including a barcode). Trailers and containers can also be actively identified through an electronic control unit that contains navigation, tracking and/or communication devices. In some embodiments, active and/or passive components enable tracking and routing of trailers and containers along a network of relay stations spread over roads and highways. The trailer and containers control unit can also include devices that monitor conditions of transportation, storage, distribution and sales of goods and services which are loaded inside.

Similar to cargo segmentation, truck routes are also segmented into smaller routes allowing drivers to make it back home after a workday. Truck routes can be divided up into two groups: trunks and Last Mile Routes —LMR—. Last mile routes —LMR— connect user premises with the nearest relay station or gateway. Independent truckers or trucking companies move trailers from customers' premises to relay stations and vice versa using LMR. Trunk routes can connect distant locations by chaining circular routes allowing the exchange of trailers between relay stations located on either side of the road. Chaining circular routes or trunks can mobilized large amount of trailers and containers over long distances. This can occur non-stop 24 hours per day without the drivers having to stay awake non-stop.

Trunk routes can accumulate huge amount of cargo keeping high levels of occupancy and efficiency in all directions. Therefore, according to several embodiments, many transportation companies and independent carriers can tow or transport trailers and containers wherever and whenever they are willing or able to do so, implementing an open network of service providers. Several embodiments further enable the transportation companies for each segment/route/relay station to operate synchronously as they were a single company.

In several embodiments, the transportation system disclosed herein can be implemented by a network of computing devices, such as trailer control units (TCUs), relay station control units (RSCUs), vehicle control units (VCUs), mobile devices that can communicate therewith, a cloud server system over the Internet, or any combination thereof. At least some of the computing devices can monitor and report information associated with the chain of custody of physical items for transportation, storage, and/or distribution. At least some of the computing devices can compute routes or partial routes to move a cargo load or a portion of a cargo load from its point of origin to a final destination. For example, a RSCU or an operator of the RSCU can generate a sub-route to a next relay station without attempting to optimize an overall route from the point of origin to the final destination (e.g., a cross-country route).

In several embodiments, the transportation system provides services to support the transportation, storage, and/or distribution of physical items. For example, the transportation system can provide a web portal to track cargo load transportation progress, distribution analytics, geolocation movements, or any combination thereof. In several embodiments, the transportation system can provide services by the transportation, storage, and/or distribution of physical items. For example, the physical items can be energy providing components (e.g., batteries, fuel, solar cells, etc.), healthcare equipment, data center infrastructure, entertainment systems, financial systems, living spaces, food processing equipment, or any combination thereof. The transportation, storage, and/or distribution of these physical items enable energy storage and distribution services, mobile healthcare services, mobile data center services, mobile entertainment services, mobile financial services, residential or commercial rental services, food truck services, or any combination thereof.

Some embodiments of this disclosure have other aspects, elements, features, and steps in addition to or in place of what is described above. These potential additions and replacements are described throughout the rest of the specification

BRIEF DESCRIPTION OF THE DRAWINGS

FIG. 1A illustrates some exemplary control units that are installed on trailers/containers, tow/transportation vehicles and relay stations to coordinate the transportation and storage of products and services which are loaded on aforementioned trailers/containers, in accordance with various embodiments.

Figure 1B:
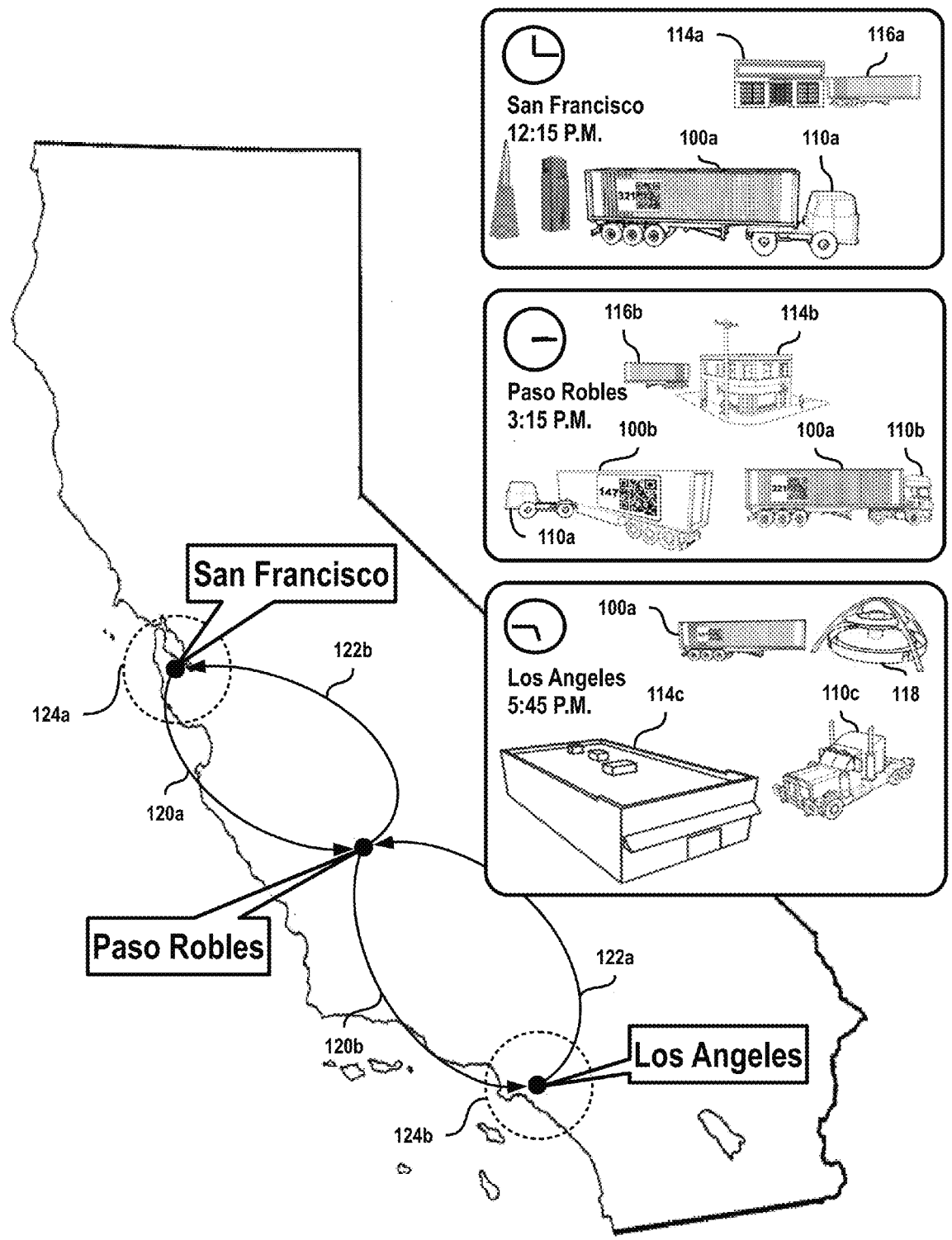
FIG. 1B illustrates an exemplary process or transportation model based on the use of multiple relay stations, in accordance with various embodiments.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Several embodiments include a transportation platform system. Goods and services can be loaded into trailers and containers to be transported, stored, processed or sold. Trailers and containers can have passive elements, such as printed bar-codes and printed alphanumeric serial on the outside. The passive elements enable an electronic device in an inventorying device to identify the containers or trailers (e.g., electronically or visually through cameras, optical sensors, etc.). Other types of passive elements, such as radio frequency identifiers (RFIDs) can also be used. Containers and trailers can have active devices such as on-board computers coupled to a wide variety of peripherals. The active devices enable, among other things, identification of the trailers and containers remotely using wired or wireless networks in addition to tracking their routes (e.g., including whereabouts and geographical positions in all times and places during transportation).

In several embodiments, trucks and other self-propelled vehicles not only tow or transport containers or trailers but also monitor and exchange data and information with active devices or on-board computers mentioned above. Self-propelled vehicles or tow/transportation trucks can contain compatible active devices based on the same communication technologies of trailers and containers. Being able to identify (e.g., visually or electronically) and to track routes and whereabouts of trailers, containers and tow/transportation vehicles remotely, a transportation platform gains the possibility of using compatible active devices in service stations, truck stops or elsewhere to detect their passing over the roadway. Having and deploying passive elements and active devices mentioned above, it is possible to implement an open network of transportation, storage, distribution and sale of the contents of containers and trailers using relay stations as a packet switching network, enabling the transportation platform system to mimic how digital networking functions (e.g., Internet protocols).

Instead of towing or transporting trailers/containers from an origin (e.g., point A) to a destination (e.g., point B), this route can be divided up into segments. In each segment, the tow/transportation truck can be exchanged in a place called, a relay station. Tow/transportation trucks and drivers may or may not share corporate identity or labor relationships so an open network of service suppliers is implemented. By segmenting the route from point A to point B, an important increase in productivity is achieved in the transportation industry by reducing backhauling or the number of truck's empty miles. To achieve this, two type of segments are defined: trunks and Last Mile Routes —LMR—. LMR routes are the segments between the nearest relay station to the origin or the final destination. In other words, LMR routes connect user premises with the nearest relay station or gateway.

In some embodiments, trunks are segments that connect distant places or relay stations where truck exchange is convenient or necessary so truck drivers make it back home the same workday by driving the truck using circular routes. Chaining circular routes or trunks can mobilized large amount of trailers and containers over long distances, non-stop 24 hours per day. Thus, trucks become similar to rail freight transport which uses predefined routes defined by railroad tracks. When relay stations or a switched scheme are used, the adoption of trucks operated with renewal energies and friendly environment fuels is facilitated.

Trailers and containers can be used to store goods and services. Trailers or containers of different sizes and applications can be used to segment cargo into smaller quantities for transportation or storage. The transportation platform system can implement a network addressing protocol, enabling mimicking of digital networks (e.g., an addressing technique similar to Internet protocol packets). Each trailer and container can be routed by setting up an end-to-end route with the exact amount of content required by the end destination. This saves time and cost by reducing or avoiding the use of distribution warehouses, storage racks, forklifts, material handling equipment, cargo transference and labor. Containers and trailers can transport and store cargo for as long as is needed, therefore facilitating their use for storing and warehousing of goods and services. This scheme is also useful to make a move. Adding a rack or a dispensing machine to a trailer or container can convert a parking lot or a storage facility into a mobile mall or a market place in a short period of time.

Trailer/Container, Tow/Transportation Vehicles and Relay Stations Control Units

FIG. 1A illustrates example devices of trailer/container control units (hereafter referred to collectively as "TCU"—Trailer Control Unit—) 104a, 104b, 104c, 104d and 104f which are installed on trailers 100a, 100b, 100c, container-mover setup (when these components are independent units) 100d and 100e respectively. The TCU 104a, 104b, 104c, 104d and 104f can actively establish geographic location, keep log information and route to the final destination of containers and trailers while being carried or towed by a series of different tow/transportation vehicles, while controlling and transmitting this and many other variables across multiple wired and wireless telecommunications technologies. For simplicity purposes, the word "trailer" is going to be used both to describe the container-mover setup (mover chassis as an independent unit from the container where goods and services are contained) and the trailer (chassis and container are the same unit). The word "trailer" also extends to any type of container with or without wheels including but not limited to: packages or containers of any material or shape, backpacks, bags, boxes among other options as long a TCU is included.

An example of a separated or independent units is the setup of a sea containers attached to a mover-chassis when they are on the road. Indeed a shipping sea container can be adapted to operate as described in FIG. 1A by installing a TCU on that container. The TCU 104a, 104b, 104c, 104d and 104f are always attached to the container that stores cargo, especially when containers 100d and 100e are independent units from a mover-chassis. However, mover-chassis can also use the TCU 104e as a redundant control unit. The TCU 104a, 104b, 104c, 104d, 104e, 104f are tracking trailers 100a, 100b, 100c, 100d, 100e all the time and places to coordinate containers-content transportation and exchange by tow/transportation vehicles 110a, 110b, 110c, 110d also including but not limited to other tow/transportation options like motorcycles, bicycles 110e or people 110f which exchange trailers along the path from a point A (source) to point B (destination) previously programmed in the TCU. FIG. 1A also illustrates Truck/Vehicle Control Units (hereafter referred to collectively as "VCU"—Vehicle Control Unit—) 108a, 108b, 108c, 108d, 108e and 108f that are installed on tow/transportation trucks 110a, 110b, 110c or can be installed on other transportation vehicles including but not limited to: 110d cars, motorcycles, bicycles 110e or people 110f respectively.

FIG. 1A also illustrates Relay Station Control Unit (hereafter referred to collectively as "RSCU"—Relay Station Control Unit—) 112 that are installed in the relay station 114, to coordinate the transportation and storage of goods, merchandise and services in the trailers. The trailers 100a, 100b, 100c, 100d and 100e can be any size within traffic regulations when traveling on public roads and can carry or store all kinds of goods in solid, gaseous or liquid state. The trailers 100a, 100b, 100c, 100d and 100e may specialize in transporting or storing goods or services so that there would be different kinds of trailers, such as open trailers, closed trailers (e.g., van-type, box-type), tank trailers (e.g., transportation of liquids, powder, gases), refrigerated trailers, battery or solar cells trailers to power electric trucks or remote locations, dump trailer, greenhouse trailer for cultivation of plants, probe trailer to collect data, communication trailer to provide telecommunication services in remote locations, vending machine trailers, retail sales trailers, office trailers, moving trailers, traveling/RV trailers, ambulance trailers, other type of trailers or containers, or any combination thereof.

As for cargo (e.g., weight and volume of cargo) capacity, trailers may have one or several axles. As for the rigidity of axles, chassis hardness and tire size, trailers can be designed for rough roads like those trailers used by the military. As for trailers size, there is size limit set by the local authority in each country, state, province, county, city or town when trailers travel on public roads. Size of smaller trailers could be a fraction of larger ones so trailers can be stacked up and secured in groups based on ascending scales of weight and volume so they can be towed or transported by different transportation alternatives including but not limited to people 110f, bicycles 110e, cars 110d, motorcycles, step-van trucks 110c, pickup trucks 110b or tractor trucks 110a.

Trailers or group of trailers can be towed or transported by any self-propelled vehicle considering weight and volume capacity of content and also weight tare of trailers. Some examples of self-propelled vehicles include without limitation to: cars, pickup trucks 110b, step-van/delivery trucks 110c, cars 110d, motorcycles, bicycles 110e or people 110f. Trailers can also be stacked up or grouped so that they can be secured and transported by tractor truck 110a, railroad car, aircraft or stored in a shipping container to be transported on a vessel among other alternatives. All these self-propelled vehicles must have proper accessories to hook up trailers when they are towed. Some examples of those accessories include but not limited to these types of couplings: pintle hook, ball, goose-neck, Lazy Susan and fifth wheel. Thus for example, a single tractor-trailer can transport a group of stacked trailers with different types of goods or services.

The self-propelled vehicles can also be stacked up or parked for storage of goods or services in various place, such as parking lots located in industrial areas or suburbs, parking buildings, storage areas, logistic warehouses, industrial plants, manufacturing facilities, garages of homes or buildings, truck stops, relay stations 114 or any combination thereof. The trucks 110a, 110b, 110c, car 110d or any other self-propelled ground transportation options for towing trailers can use a power-train that operates with engines using different fuels including but not limited to: diesel, bio-diesel, bio-gas, propane, natural gas (Compress Natural Gas —CNG—), liquefied gas (Liquefied Natural Gas —LNG—), compress air, gasoline, electrical power (AC o DC electric motors), fuel cells. Power-train transmissions can be manual, automatic or electronic (trucks and electric cars with electronic speed and torque control systems).

Trailers can be made of steel, aluminum, composite materials, fabric, wood, synthetic/carbon fibers, metal-chemicals alloys, plastics among other materials. Trailers are visually or passively identified by an alphanumeric code associated with a labels 102a, 102b, 102c, 102d and 102e (collectively as "labels 102"). Bar-codes can be linear or two dimensional. The labels 102a, 102b, 102c, 102d and 102e are painted or stick to the trailers 100a, 100b, 100c, 100d, 100e. The labels 102a, 102b, 102c, 102d and 102e together with the TCU 104a, 104b, 104c, 104d and 104f can be identified graphically (passively) and/or electronically (actively) every trailer anytime, anywhere. Alphanumeric code and bar-code printed on trailer labels, intended to establish universal, open, neutral identification platform-level addresses, can be assigned to nodes or terminals connected to the transportation platform network. This enables the transportation platform system to route and track trailers or containers end-to-end from anywhere to anywhere in the transportation platform network (e.g., as wide as any location traversable by a vehicle).

The labels can include related information with the TCU's network components including but not limited to: MAC address (Media Access Control Address), current and historical IP addresses, domain and sub-domains and generally all possible identifiers derived from standards made and enforce by ICANN (Internet Corporation for Assigned Names and Numbers). So the elements illustrated in FIG. 1A rely on networks currently operating successfully worldwide as the Internet. Those elements also allow to embrace new standards coordinated by the same organization including but not limited to, for example, emerging protocols like IOT (Internet Of Things). Currently mail carriers use proprietary coding systems for routing packets or correspondence within internal logistics network of each company.

A passive labeling and bar-coding system along with active devices such as TCU which embrace open and globally standardized protocols, enable routing, transporting, storing or distributing trailers and their content on a global and open scale. Therefore carriers and operators with no corporate or labor ties can integrate an open network of services allowing participants to coordinate different providers like they were a single global organization. Both TCU and printed labels can separately identify trailers but it is expected to operate simultaneously all the time and everywhere. However one of them can stop working and still be able to identify the trailer especially under certain circumstances including but not limited to: faulty/broken TCU, label deletion or loss, small container which does not justify the use of TCU, or any combination thereof. Regarding trailer labels, anyone can visually identify the number or alphanumeric code that could match or include trailer plate characters. Trailer bar-codes can be scanned and decoded with a tablet, smart phone or any other device capable of capturing an image and decoding/identifying code by accessing a local or remote computer program stored on the memory device or a remote server accessible via wired or wireless link. After bar-code scanning and decoding is over, code is associated with a database to identify the trailer, its technical characteristics and content if available. Augmented reality application can also be used so information layer and live trailer image, display trailer information and features including: origin, destination, programmed route, place of storage or parking, content, hazmat (hazardous material) warning, technical feature among other information.

The trailers 100a, 100b, 100c, 100d and 100e can also be identified actively or electronically by using ports and wired or wireless links embedded in the TCU 104a, 104b, 104c, 104d and 104f which have radios and network interfaces NIC (Network Interface Card —NIC—) that can send information through technologies such as Bluetooth, WiFi, GPRSM, Ethernet, or wired and wireless telecommunications technology that can interact locally or remotely with a compatible receiver and a database to identify and store information of trailers and their contents. The TCU 104a, 104b, 104c, 104d, 104e and 104f can interact with smart-phones or tablets among others devices. Based on this communication capabilities a smart-phone, for example, can set up the TCU 104a, 104b, 104c, 104d, 104e and 104f to define settings like: origin, destination, cargo weight, cargo density or weight/volume ratio, delivery priority, hazmat (hazardous materials) warning, delivery priority alert activated when environmental friendly trucks are used to reduce pollution by using alternative fuels, shipper and recipient contact information, cargo handling and transporting special instructions, type of service (service mode) to be provided including options such as transportation, warehousing, self-storage or retailing, among other settings.

If a smart-phone or remote device is not available to program a TCU, the input/output devices 106a, 106b, 106c, 106d and 106e can be used instead. They can be installed in the cargo section of the trailers 100a, 100b, 100c, 100d and 100e respectively, so a user can set up a TCU directly. The input/output devices 106a, 106b, 106c, 106d and 106e can be implemented with touch screens that allow anyone to enter and display the programmed settings and relevant information of the service to be delivered. Input/output devices can also be implemented with display-keypad combination, voice-recognition devices, electronic pen among other types of interfaces.

When a trailer is set up to move cargo from the place of origin to destination, the tow/transportation vehicles 110a, 110b, 110c or 110d can take turns to move the trailer a number of miles to the final destination within origin-destination route segments. Making an analogy with the way the Pony Express worked, the tow/transportation vehicles 110a, 110b, 110c, 110d, 110e and 110f can resemble the horse-rider combination; the trailers 100a, 100b, 100c, 100d and 100e resemble knapsack or mochila; and the relay stations 114 (e.g., trailer exchange points) resemble relay stations where mochilas were exchanged and riders and horses were able to rest.

In order to coordinate trailers exchange along roads and routes, the tow/transportation truck 110a, 110b, 110c, vehicle 110d, bicycle 110e or person 110f can use the vehicle control units VCU 108a, 108b, 108c, 108d, 108e and 108f respectively. The VCU 108a, 108b, 108c, 108d, 108e and 108f read stored and generated data from each trailer's TCU which is hooked up or transported by tow/transportation vehicle. The VCU 108a, 108b, 108c, 108d, 108e and 108f can access and display truck-driver information and keep an event log of each trailer that is towed or transported including information about: service mode or status (e.g., transportation, warehousing, self-storage, retailing, trailer for rent, trailer under maintenance, etc.), origin-destination, delivery priority, special instructions for loading, unloading and transportation of cargo, trailer status including alarms like flat tires, shocks or oscillations (trailer sway), opening doors, brake system alarms, among other alarms and events.

The tow/transportation vehicle control unit or VCU 108a, 108b, 108c, 108d, 108e and 108f also supervise each trailer TCU status specifically TCU's subsystems, such as wireless communication radios, internal cables and connections status, connections status between trailers, positioning and navigation system, brake system monitoring status and condition, alarm system or any combination thereof. Both the VCU 108a, 108b, 108c, 108d, 108e and 108f as well as the TCU 104a, 104b, 104c, 104d and 104f keep logs and record information about origin and destination of each trailer and track in real time if each trailer is going to the final destination.

Tracking data and equipment in real-time and along all locations can enable the transportation system to monitor the chain of custody in the process of transporting, storing, distributing and selling goods and services (e.g., when using trailers and a chain of different operators and carrier companies without corporate or labor ties). Therefore, FIG. 1A shows members of an open network of transportation, storage, distribution and sale of goods and services similar to open digital switching networks (e.g., Internet). Unlike digital switching networks, the transportation system does not use servers, switches, routers, and computing devices to transport digital packets, but rather uses the VCUs, relay station units, TCUs, etc. to form an open network to route physical goods. The routing methodologies and communication protocols of digital switching networks can thus be applied to the transportation system.

Keeping records of the chain of custody updated and available at any time and place, ensure high level of quality and few claims of the services offered by the open network of providers. The TCU 104a, 104b, 104c, 104d, 104e, 104f and/or the VCU 108a, 108b, 108c, 108d, 108e, 108f can have integrated GPS tracking, inertial navigation system, inertial sensors, radio signals triangulation devices, or any combination thereof. These geolocation devices can continuously supervise truck-trailer location and speed, trailer exchange places, trailer pick-up/release places, delivery progress (e.g., checking if tracing and tracking of current truck-trailer route is leading up to the final destination), or any combination thereof.

Wireless communications, location and inertial sensors enable the TCUs or the VCUs to trace and track each truck/trailer, thus cargo-load at any time and place despite the lack of line of sight to GPS satellites or telecommunication radio antennas. Moreover, the TCU 104a, 104b, 104c, 104d, 104e, 104f, the VCU 108a, 108b, 108c, 108d, 108e, 108f and the RSCU 112 all have wireless links allow them to interact with each other and exchange and update information of each mobile unit, forming ad hoc mesh network.

The relay station 114 is a strategically located throughout a city or a rural area. For example, relay station 114 may be located on the side of an interstate road or within the city limits of a city. The relay station 114 may have parking areas for trailers and trucks. Trailers can be parked for tow/transportation vehicle exchange, thus continuing the journey to the final destination. Trailers can also be parked on relay stations for renting, maintenance or repair. The relay station 114 may have a parking area with horizontal and/or vertical stacking facilities for trailers so a company or individual can distribute, store or sell goods and services contained on trailers. For this reason, any building or construction located in a rural, urban or semi-urban area can be used as a relay station 114 allowing goods, raw materials or services being closer to production, distribution or commercial centers. Example of places that could serve as relay stations include without limitation: gas stations, warehouses, parking areas in self-storage facilities, parking places in logistics warehouses, parking lots of wholesale stores and malls, backyard or front yard of a house. Any of these places can be used as a trailer parking area for storing goods or belongings or a parking area for trailers which are in transit to another relay station or the final destination. Therefore a warehouse storage facility usually is a building of large proportions to centralize the storage and distribution of products in one place, so it can be replaced by a distributed network of parked trailers which are moved all over the distribution area with products or services contained inside.

In this way, products and services are almost in the same neighborhood of end-users or factories, ready for delivery, saving time and money represented in fuel expenses, reducing or avoiding the use of warehouses and related handling material equipment like forklifts, pallet racks, pallet jacks, cranes, jib, hoist or any combination thereof. This makes supply chains more simple, economical and productive as products and services can be shipped from the factory to the consumer using the same loaded trailer with the precise amount of goods or raw materials needed in certain distribution area. So trailers serve as transportation, storage and distribution vehicle simultaneously. Moreover, if trailer contain vending machines, shelves or cooking equipment, trailers can also serve as a mobile stores or retailing facilities.

Additional benefit offered by the items of FIG. 1A is the rapid deployment of response units, emergency and support facilities in case of a disaster or events that affect populated areas, buildings, urban infrastructure, etc. Regions affected by natural disasters such as floods, earthquakes, hurricanes, tsunamis can be supported instantly with the use of trailers, tow trucks and relay stations described in FIG. 1A. Parking, stacking and storing trailers with display cabinets or vending machines organize a mobile mall or marketplace. The relay stations can be dynamic or improvised anywhere especially when exchanging trailers along the road. By constantly monitoring each trailer and constant communication with tow/transportation vehicles, it is possible to coordinate the exchange of trailers at a location agreed upon by the parties. Ad hoc stations or dynamic relay stations can replace conventional stations for causes such as accidents, closed roads, landslides or blockages in the road, jams, saving time, rerouting among other causes.

The relay station 114 along with the RSCU 112 can incorporate optical sensors, which are able to identify trailers passively by scanning the labels 102a, 102b, 102c, 102d and 102e. This way, trailers with broken or malfunctioning TCU could be passively tracked and traced by the components described in FIG. 1A. Trailers also may or may not have bar-code and still be able to operate on the network. Trailer may have the bar-code and not the TCU and operate within the network. Then packages, backpacks, boxes or other packaging containing goods or services to transport, store, distribute or sell can be passively (e.g., visually, inductively, electronically, etc.) or actively (electronically) tracked using the label and/or the TCU. In some embodiments, all active and passive identification, tracking and tracing components work simultaneously, and can sometimes complement each other and sometimes work as redundant components. The end result of this cooperation of the devices can be increased reliability, reliance and security of an entire transportation network. However depending on the complexity of the trailer, the value or size of the load, the level of service offered or the cost associated with the container, the complexity of the TCU would be different. Packages, bags, mochilas, bags and/or boxes can also serve as trailers only if they have one or more active or passive components for identification that are compatible with the control units of FIG. 1A (e.g., TCU, VCU, RSCU, or any combination thereof) and can be tracked and traced within the network infrastructure of the transportation system. The infrastructure created by the components of FIG. 1A can interact and function to keep the chain of custody of trailers at all times and in all places.

Example Network Functional Model Made of Trailers, Tow Vehicles and Relay Stations to Transport Goods and Services.

FIG. 1B illustrates an example of how to use a trailer to transport merchandise, goods or services from the origin in the city of San Francisco to the final destination near a final destination 118 (e.g., Los Angeles airport). The user who rent the trailer 100a in the city of San Francisco, loads cargo and sets up the TCU introducing among other data, origin and final destination, so that this information can be accessed at any time and place. The TCU can only be reconfigured when the trailer 100a is used for another service or when available for rent. The information stored on the TCU, allows to route the trailer 100a from relay station to relay station up to where tow/transportation vehicle exchange is done.

The disclosed transportation system enables driver shifts and truck exchanges by utilizing delivery request information obtained from a TCU. The disclosed transportation system can integrate conventional transportation means with circuit switching technologies (e.g., where information and electrical signals travel through a cable that extends from the transmitter to the receiver). For example, the transportation network, illustrated in FIG. 1B, may emulate a digital telecommunications paradigm that is based on packet switching technologies (e.g., the Internet/IP Protocol). The transportation system can track physical goods instead of digital content.

The transportation system can divide a cargo load into separate cargo portions (e.g., pieces). The cargo portions can be routed individually, sometimes resulting in different paths and out-of-order delivery. Each cargo portion can store cargo delivery information (e.g., source and destination information) via a passive label and/or an active control unit (e.g., a TCU) in a trailer holding the cargo portion. The cargo delivery information enables a terminal (e.g., a relay station) at the intended destination of the cargo load to reassemble the cargo load by taking the cargo portions and assemble them in an original pattern (e.g., a particular order or arrangement) as they were sent from the source terminal.

The transportation system, according to various embodiments, can implement a transportation network, such as the transportation network illustrated in FIG. 1B. The transportation network can convert traditionally continuous and static path routing into discrete and dynamic routing. Traditionally, trucks and their cargo take continuous paths between source and destination, have fixed truck's cargo capacity from origin to destination, and have monolithic chassis with fixed volume and weight capacity. The transportation network enables on-demand capacity and variable capacity according to the load to be transported. The transportation network enables quantization of a cargo load into discrete units or packages during transportation. In several embodiments, the transportation network also enables reassembly of the cargo load after transportation.

In several embodiments, instead of continuous paths between source and destination, trailers can be towed between segments where trailers and tow/transportation vehicles are exchanged. Instead of using a single truck with fixed capacity, trailers (e.g., smaller trailers than the fixed cargo chassis of the single truck) can store and transport smaller quantities of cargo. The trailers can be stacked up or combined according to load requirements at destination. For example, the transportation network can recognize trucks that are underutilized by traveling under maximum carrying capacity. In response, the transportation network can use the underutilized trucks according to the number of single or stacked trailers that such trucks can carry or tow. This process maximizes the utilization of cargo space in transportation vehicles (e.g., trucks or otherwise).

Continuing the process described in FIG. 1B, once the trailer 100a is loaded, programmed and hooked up to the tow/transportation vehicle, the trailer 100a can be taken from the user premises to the nearest relay station 114a located, for example, in the city of San Francisco. The same user can tow the trailer using his/her own self-propelled means of transportation or the user can request the services of a short distance operator or also called Last Mile (LM) operator (hereafter referred to collectively as "LM"). LM operators can tow trailers from user premises to relay stations and vice versa so they drive their trucks within short distance or LM service areas as 124a or 124b. Depending on the size of the trailer chosen by the user, the LM operator can use a truck with suitable power and size. Once the trailer 100a reaches the relay station 114a in the city of San Francisco, the tow truck 110a can be assigned for towing and it operates long-distance circular routes. In one example, the tow truck 110a travels in both directions between San Francisco and Paso Robles. The truck 110a tows trailers using route 120a from San Francisco to Paso Robles and also uses the complementary route 122b from Paso Robles to San Francisco.

Routes are not necessarily the same as highways and roadways. Routes can be defined as a way to join two different geographical locations and the direction of the path that connects them. In some embodiments, one route can use different highways. An operator who connects LM areas, can operate on circular routes or circular cycle routes (hereinafter a "trunk operator"). The trunk operator can be used to connect metropolitan areas, suburbs, and/or LM areas (e.g., service area 124a around San Francisco and service area 124b around Los Angeles).

"Trunk routes" aggregate large amount of trailer traffic or cargo in two-way mode so circular routes are used. Again, trunk routing is enabled by the transportation system that maps physical transportation terminals into a decentralized address space similar to digital telecommunication networks. Trunks in digital telecommunications networks, for example, connect LANs (Local Area Network —LAN Networks—) together and/or MANs (Metropolitan Area Network —MAN Networks) together. Telecommunication trunks use point to point topologies while LAN and MAN networks connect nodes, which are confined in a certain coverage area using point-multipoint, hub-and-spoke, bus or star topologies. LAN network connect devices confined in the same physical space as homes, offices, buildings, campus, or any combination thereof. MAN networks connect nodes confined within metropolitan areas of cities.

For this reason, the transportation system can design LM service areas 124a and 124 to mimic the areas of LAN and MAN digital networks. The routes 120a, 120b, 122a and 122b, taken individually or chained, can form point to point links between the LM service areas 124a and 124b. The transportation system can also design its service areas to mimic areas of a Wide Area Network (WAN). Networks formed by connecting distant LAN and MAN networks together are WAN networks. In other words, WAN networks are those that extend beyond LAN and MAN networks and can correspond, according to the FIG. 1B, to the routes 120a, 120b, 122a, 122b.

The transportation network can be composed of nodes and links. However, unlike telecommunication networks having computers, servers, tablets, smart phones, routers or switches as nodes and data connections as links, the transportation network has at least relay stations as nodes and transportation routes as links. Instead of packets of digital bits traveling between the telecommunication nodes, the transportation network has physical cargo portions traveling between the relay stations.

For example, the "nodes" of the transportation network of FIG. 1B are: the relay stations 114a, 114b, 114c, place of origin in San Francisco and the final destination 118 in Los Angeles. In this example, the "links" of the transportation network of FIG. 1B are: the routes 120a, 120b, 122a and 122b and the internal roads in metropolitan areas formed by LM routes. Cargo portions of one or more cargo loads can travel between nodes through links. The cargo portions can be carried by tow/transportation truck and trailers, each containing the products and goods to transport, store, distribute, sell, or any combination thereof.

Continuing the process of trailer transportation depicted on FIG. 1B, the tow truck 110a and the trailer 100a can depart from the relay station or "node" 114a. The relay station 114a can connect LM service area 124a with long haul trunk towards Los Angeles but passing through the relay station or "node" in Paso Robles. The departure time according to FIG. 1B is 12:15 PM. At the very same time, the trailer 116a is also found in the relay station 114a parked in the storage or parking area. The trailer 116a may be parked in the relay station 114a to be towed, leased, put in maintenance or being used for self-storage or distribution of goods. A few hours later, the truck 110a and the trailer 100a reach the relay station 114b in Paso Robles. The trailer 100a is in transit while truck 110a is disengaged. Minutes later the trailer 100a can be engaged again and towed by the truck 110b. The truck 110b can covers a circular route from Paso Robles to the city of Los Angeles, crossing the routes 120b and 122a. The route 120b goes from Paso Robles to Los Angeles and the route 122a goes from Los Angeles to Paso Robles. In turn the truck 110a hook up the trailer 100b which was parked on the relay station 114b, to be towed to San Francisco. At 3:15 PM the truck-trailer sets 110a-100b and 110b-100a depart from the station 114b in Paso Robles to San Francisco and to Los Angeles respectively.

In some cases, the truck-trailer sets shown in FIG. 1B can depart simultaneously. In some cases, the truck-trailer sets can depart at different times. A tow truck can return via a different route, depending on the demand for transportation services at the exit of the relay station. When a trailer switching/exchange scheme (e.g., mimicking a packet switching technique in telecommunication systems) is used as described in FIG. 1B, the transportation system (e.g., via a computer system in a trailer, its transportation vehicle, or a relay station) can seek to reduce trailer transportation costs and to increase the speed of trailer transportation.

As an example, fleets of delivery trucks that cover LM areas can depart from distribution warehouses with products that are delivered across the distribution zone. At the end of the day, delivery trucks may return to the distribution warehouse unloaded, consuming fuel, wasting consumables, such as tires, brakes and lubricants, causing more wear to the engine and eating labor-hours without any economic benefit. In LM areas, the ratio between unproductive/empty miles over total of traveled miles ("backhauling" is the industry related term) could reach 50%. In some cases, if all the distances traveled by delivery trucks, which transport groceries and other products in a developed economy, are added, the total distance can represent inefficiency equivalent to some points of GDP (Gross Domestic Product). Similarly, in the long-haul road transportation industry unproductive distances are smaller in relative terms or percentage, due to brokers who are constantly looking for cargo and updating drivers through telecommunications networks. However, if backhauling in long haul journeys might reach 10 percent on average, the inefficiency figures will reach no small amount considering the long haul trucks are the largest, travel longer distances and consume more fuel.

By segmenting the service areas in LM and trunks, empty miles can significantly be reduced. For example, delivery trucks can tow trailers on the way back to home-base or distribution warehouse. As distribution fleets have regular routes and extensive coverage, fleets can use idle miles for transporting trailers owned by other companies, saving money, generating income from resources previously wasted, reducing greenhouse gases, even the number of trucks in the area, or any combination thereof.

Regarding trunks, a chain of trucks traveling circular or symmetrical routes form a point-to-point transport system which can operate 24 hours, transporting large volumes of freight capacity in both directions with great reliability, speed and efficiency. By securing large volumes of cargo that are added at the nodes of the trunks for transportation in all directions, the transportation system can facilitate the use of large carrying capacity trucks rolling almost 100% of its rated capacity, 24 hours a day (several shifts for one or more trucks conform 24 hours truck shifts) in both directions of travel, saving fuel, number of trucks rolling and related costs. This would be comparable to rail transport not only in their mode of operation but its advantages.

For example, drivers of large trucks usually spend months away from their homes under the current model of long haul transportation. Based on the diagram of FIG. 1B, a truck driver working day can begin and end in the city of origin, decreasing or disappearing the time away from home. It is important to clarify that a driver and his truck can depart and arrive at the place of origin taking different routes which are not necessarily complementary. Thus, a new, stable and profitable life style would attract more people to work in the long haul freight industry reducing the current high turnover of drivers that adversely affects the trucking industry and the entire economy as a consequence. Furthermore safer roads would be the result of drivers traveling along roads which are familiar with them. However, even in the future scenario of using self-directed or drones trucks, the packet switching scheme of FIG. 1B, saves time and cost throughout the entire economy.

The transportation system enables an analogy between digital telecommunications and the transportation scheme of FIG. 1B. The transportation network can transport trailers within a LM area under a multipoint topology, such as bus, star, or mesh networks. Trunks, in FIG. 1B, can mimic point-to-point telecommunications networks. Thus, alternating LM with trunks can take a truck-trailer anywhere. In digital telecommunications terms, devices which connect LAN and MAN networks with WAN networks are called gateways. Thus, the relay stations 114a and 114c are the gateways that connect both the LM service areas 124a and 124b as well as the routes 120a, 120b, 122a and 122b of FIG. 1B (e.g., trunk routes).

The transportation system of FIG. 1B can facilitate the introduction of transportation technologies which replace fossil fuels. As a trailer is towed by a variety of trucks along different paths making up the route between the origin and the final destination, these trucks can be powered by electric motor, fuel cells, natural gas, bio-diesel, among other fuels. Thus there would be routes located in regions where the use of one type of fuel is cheaper or convenient. For example, there are states like Arizona, Nevada or California where solar energy is cheap. In those states, electric tow-trucks can charge their batteries. A green index maintained by one or more computing devices in the transportation system can establish the relationship between the number of miles where the trailer is towed by a truck that use renewable or green energy, with respect to the number of miles that comprises the total origin-destination path. Thus the use of the transportation scheme of FIG. 1B enables implementation of environmental policies in some countries where the use of grants, loans or selling carbon credits to other companies are available.

Referring back to FIG. 1B, where transporting the trailer 100a from San Francisco to Los Angeles is shown, the relay station 114c (e.g., a gateway) located in the city of Los Angeles can be reached. Later at 5:45 PM, the truck 110c is driven by LM service area 124*b* operator, who disengages the trailer 100*a* at the final destination 118, near Los Angeles airport.

Figure 2:
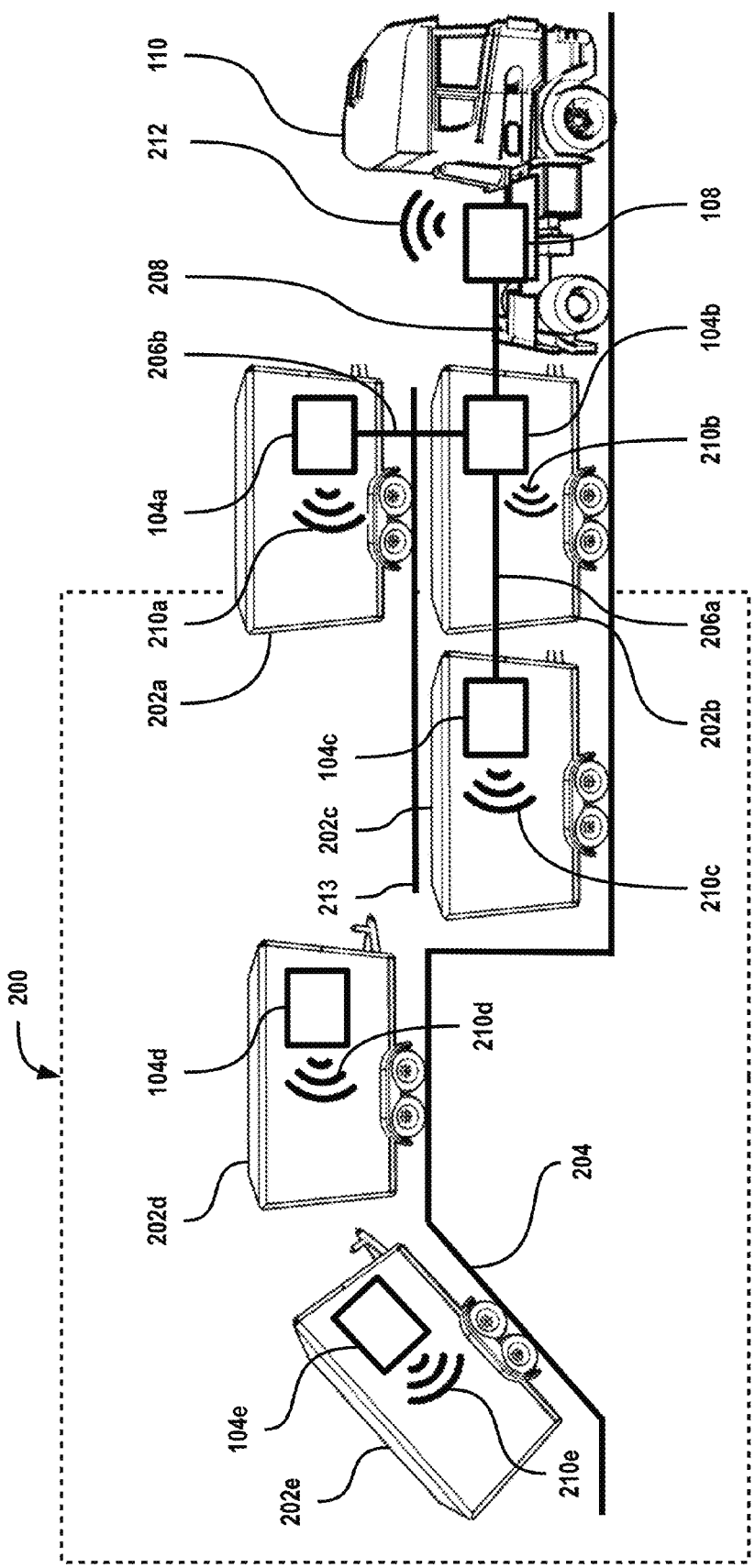
FIG. 2 illustrates an exemplary model of the operating environment of the network formed by a group of stacked trailers/containers ready for transportation, in accordance with various embodiments.

Example Grouped Trailers to be Transported by Larger and Higher Load Carrying Capacity Trucks FIG. 2 shows an example of how to group the trailers 202*a*, 202*b*, 202*c*, 202*d* and 202*e* to be transported by the tow/transportation truck 110. It may be more economical to group cargo to be transported long distances, using trucks with greater load-carrying capacity. The trunks introduced in FIG. 1B can be selected as a place to rack up, group and transport cargo or trailers brought to relay stations (gateway type) and carried through a chain of circular or trunk routes to the closest relay station and then to the final destination. Truck-trailers rolling along the trunks at high speed in both directions can be assimilated to a railroad cargo transportation.

Conventional transportation, distribution and/or logistics system may spend time transferring goods inside of trailers. FIG. 2 shows how trailers can be grouped on a flatbed trailer deck 213 coupled to the truck 110 to reduce the time spent in transferring. To stack up trailers, ramps or heavy lifting tools are used like cranes or forklifts. In the case of FIG. 2, the ramp 204 and raised platform can facilitate the process of towing trailers to the right height for grouping. The ramp 204 is located at the parking area 200 where tow/transportation trucks and flatbed trailers are parked for stacking or unloading of trailers. For example in FIG. 2, the trailers 202*d* and 202*e* are located in the ramp 204 to be moved and secured to the flatbed trailer deck 213. The movement of the trailers in the ramps can be made via many means of pushing or pulling, such as winch, tow vehicles, forklifts, lift platforms, elevators, or any combination thereof.

As trailers are grouped on the flatbed trailer deck 213, the trailers are connected to one another with the cables that are part of the TCU 104*a*, 104*b*, 104*c*, 104*d* and 104*e*. These cables can electrically wire the trailers together, when the trailers are grouped to be transported by the truck 110. If the trailer is individually pulled by a vehicle, then the wires can be connected only to the vehicle VCU. The cables connecting the TCU can be a set of interconnects, such as wires, the cables connecting the USB (Universal Serial Bus) ports of the TCU, the cables connecting LAN or Ethernet ports to the TCU, control cables, trailer brake lights, DC (Direct Current) power cables for energizing the TCU, feed the TCU support battery, or any combination thereof.

In the example of FIG. 2, the wires 206*a* and 206*b* can connect together the TCU 104*a*, 140*b* and 104*c* of the trailers 202*a*, 202*b* and 202*c* respectively. Connecting each telecommunication ports of the TCU to one another, a network is formed enabling the transportation system to monitor in real time the location of the connected TCUs, in all times and places. According to the example of FIG. 2, the VCU 108, which belongs to the tow truck 110, can have access to all or a subset of the information generated and stored in each and every one of the TCU 104*a*, 104*b*, 104*c*, 104*d* and 104*e* of the trailers 202*a*, 202*b*, 202*c*, 202*d* and 202*e*, respectively. The VCU 108 of the truck 110 can also consolidate and send to a remote computing center all the information of each trailer and truck.

In some embodiments, all the TCU and VCU have radio links. In some embodiments, the transportation system can be configured to consolidate all the information on the VCU 108 and send it from there (e.g., to save cost). The VCU 108 can also receive all or a subset remote instructions to coordinate transportation and delivery of each of the trailers. The TCU and the VCU can have at least four connectors to other external control units including LAN ports, which forms a tetrahedral structure network topology. This topology can be used to ensure a high level of redundancy in power and to control connections between trailers (e.g., considering the fact that not only can be stacked for transportation, but also for storage of physical items, as goods and/or services).

In some embodiments, with at least four connectors on each control unit, it is possible to stack up trailers on a three-dimensional matrix array. Although it is possible to use at least 2 connectors to implement a daisy chain connection array, several embodiments use at least four connectors to increase redundancy both in communications and power supply connections on each TCU. For example in FIG. 2, the TCU 104*b* of the trailer 202*b* connects the TCU 104*a*, 104*c* and the VCU 108 from the trailers 202*a*, 202*c* and the truck 110, respectively. That is, the control unit can use 3 of the 4 ports of the TCU 104*b*.

The interconnects 206*a*, 206*b* and 208 (e.g., wires and/or cables) can be used to establish the network. The cable 208, in particular, can connect the VCU 108 with each TCU from the trailers which are stack up on the flatbed trailer deck 213. Another cable can be used for redundancy purposes so another VCU 108 port can be activated and connected to a secondary port on each trailer (e.g., in case one of the cables, connectors, and/or ports stop working. The wireless links 210*a*, 210*b*, 210*c*, 210*d*, 212, serial ports and LAN ports of the TCU 104*a*, 104*b*, 104*c*, 104*d*, 104*e*, and the VCU 108 can enable creation of an ad hoc wireless and wired mesh network. This network is a means through which information can be exchanged in real time between the trailer and the tow/transportation truck and other compatible devices, which use the same wireless or wired links including places and users, such as: relay stations, mobile users, weigh stations, road authorities, others computing devices, or any combination thereof.

In some embodiments, every trailer can be accessed via wired or wireless links. By default, there can be a wired and wireless port that lets a user view a web page through a captive portal application with which the transportation system can display information, such as advertisements, traffic information, weather information, information of the content or the programming data of the trailer, maps with real time location and navigation information, emergency warning signals, information generated according to the trailer coordinates or current position, visualization of other applications, or any combination thereof.

The trailers and trucks can interact with one another by using wireless and wired ports. The trailers and trucks can have the ability to transmit location information and navigation. These features enable the transportation system to make a map of trucks and trailers, which are, for example, rolling down the streets, parked, and/or stacked up in parking lots or warehouses. In some embodiments, the wireless link is shared with cars or other vehicles not necessarily subscribed with the same transportation system but with compatible links. In these embodiments, it is possible to generate and make available (e.g., via a web portal or a mobile application portal) a map that shows how far a car is from another car. This would be helpful for drivers rolling down the road to notice if cars are approaching without even having eye contact with them. By forming mesh networks with ubiquitous radio links, such as WiFi, Bluetooth, RFID, GPRS, etc., it is feasible to spot a trailer anywhere, including underground parking lots, warehouses and inaccessible places in general. Thus, the cargo-trailer and tow/transportation truck can be tracked or easily located (e.g., regardless of where it is) at all time. The use of both wired and wireless networks to transport grouped trailers can improve the reliability of the chain of custody and quality of services offered by operators and members of the open network of transportation, storage, and distribution (herein referred to as "transportation network") implemented by the transportation system described in various figures (e.g., FIG. 1A, FIG. 1B and FIG. 2).

Example Components of a Typical Trailer.

Figure 3:
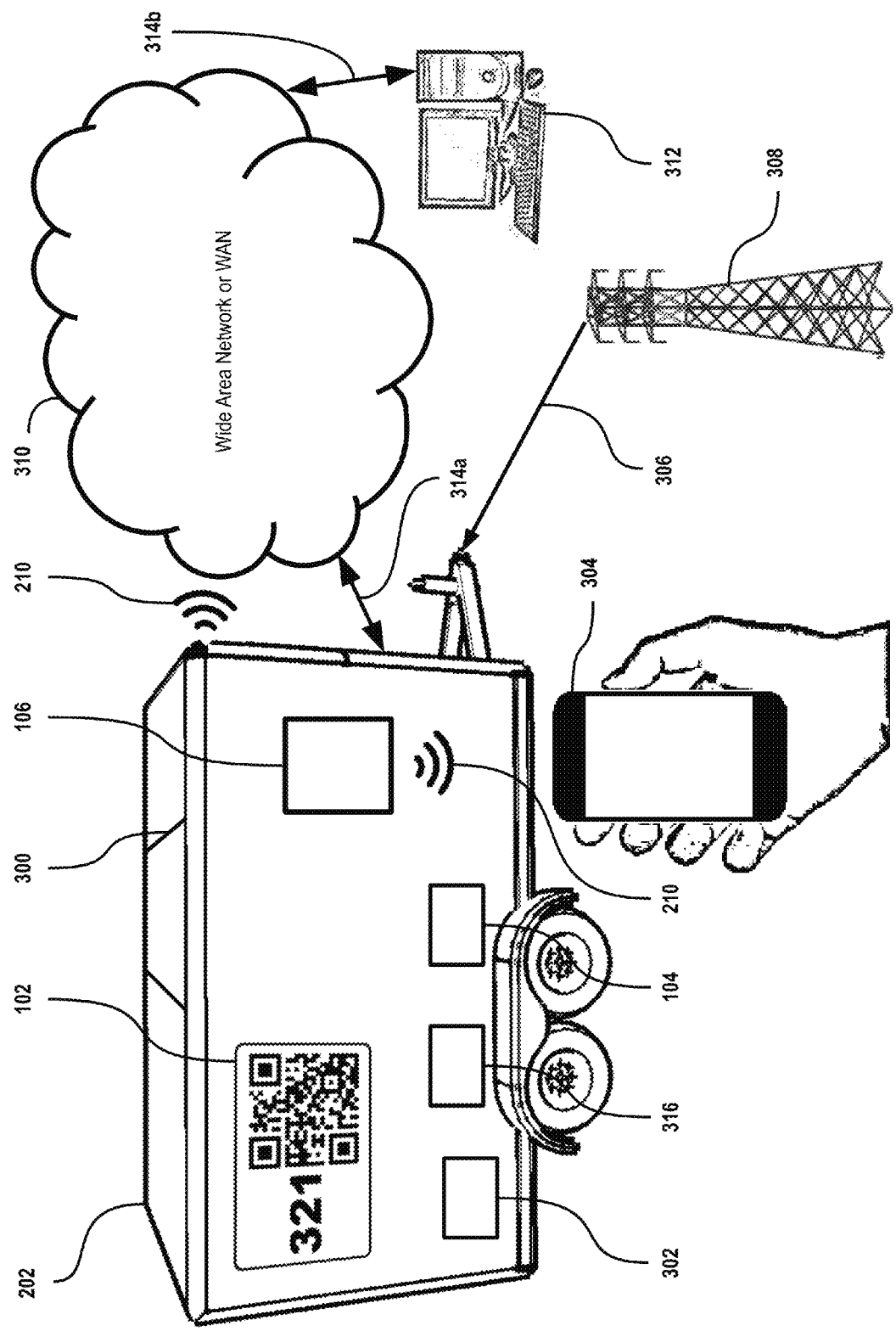
FIG. 3 illustrates an exemplary model and components of a typical trailer/container architecture, in accordance with various embodiments.

FIG. 3 illustrates an example of the basic components that are part of the trailer 202. The trailer 202 can be a closed or van type of trailer. Its walls can protect and hide the load to be transported or stored. The label 102 can have an alphanumeric code printed with a bar-code, which may be linear or two dimensional. This label can be printed on one side of the trailer. This label can also be printed on the side walls of the van and the back door. In some embodiments, the label 102 is detected and/or read visually. In some embodiments, the label 102 is detected and/or read electronically or magnetically.

The label 102 can identify the trailer and related information. For example, a sensor (e.g., an optical sensor, electrical field sensor, a magnetic field sensor, or any combination thereof) coupled to a computing device (e.g., a computer or smart-phone) can read the label 102. An application program can access the sensor. The application program can be locally stored in the computing device or available via a remote server. The application program can identify and consult all information related to the trailer, such as cargo information (type of cargo, hazardous material warning, weight, handling and unloading instructions, NMFC —National Motor Freight Classification— classification, priority delivery, renewable energy preferences, etc.), origin, origin contact information, destination, destination contact information, cargo handling instructions, instructions for loading and unloading, type of service (transportation, warehousing, self-storage, rental, maintenance, transit, retail), estimated delivery time, path traveled (during the last day, the last hour or a defined interval), approximate path towards destination, trailer serials, MAC address of the TCU 104, trailer number, history/log events, current service time of tires and brakes, calendar of maintenance, or any combination thereof.

The input and output device 106 enables the introduction and consultation of programming parameters for the trailer and the ability to read information related to the trailer, its contents, and its current use. The input and output device 106 can be connected to the TCU —Trailer Control Unit— enabling a user to enter parameters that define the service (e.g., transportation, storage, and/or distribution) to be provided by the trailer along with LM and trunk operators and relay stations. The input and output device 106 also enables the TCU 104 to interact with local and remote services (e.g., exchange information), including, for example: Internet browsing, providing captive portal services supported by the TCU 104, interaction with online retailers, electronic interface for displaying advertisements, providing business information about service network participants, stakeholders or third parties, other electronic services, or any combination thereof.

An implementation of the unit 106 includes, for example: touch screen, keyboard and display, switches integrated into the display frame, mouse and display, microphone for voice response interface commands, stylus-display, or any combination thereof. The input and output device 106 with the TCU 104 can also enable a user to enter and/or read the programmed parameters, mechanical and electrical conditions of the trailer through a wireless interface 210. For example, the unit 304 shown in FIG. 3 may be any device including but not limited to: a smart-phone, tablet, laptop or other mobile device with wireless interfaces 210 compatible with the TCU 104. The unit 304 can let a user to read and/or write programming settings and relevant information of trailer 202. The wireless interface 210 or wired interface (serial port, LAN port, among others) 314a can connect the TCU 104 with a wide area network 310 (e.g., connected to other computers). The TCU 104 can interact with computing resources including but not limited to: local database, online remote databases, web pages, online technical libraries, other devices, such as a remote device exemplified by the personal computer PC (Personal Computer) 312, or other computing resources locally or remotely accessible via the telecommunication links 314a or 210, or any combination thereof. The remote device 312 via link 314b can read the parameters stored or generated by integrated sensors to the TCU 104 provided that it is online or connected to the wide area network 310 via link 314b or 210.

The trailer 202 can contain a battery 302 that powers the TCU 104 and stores electrical power generated by various sources including, for example: solar panels 300, generator-regulator coupled to the rims 316 or wheels, power line 306 plugged into the power grid 308, the power line 306 plugged into a battery-alternator of the tow/transportation vehicle, or any combination thereof. In some embodiments, the goal is to keep a fully charged battery so the TCU 104 is powered during the time the trailer is in use or available for rent. In several embodiments, the trailer 202 can have RFID tag (e.g., the label 102) and/or passive devices that can identify the trailer without power applied to the TCU 104.

Figure 4:
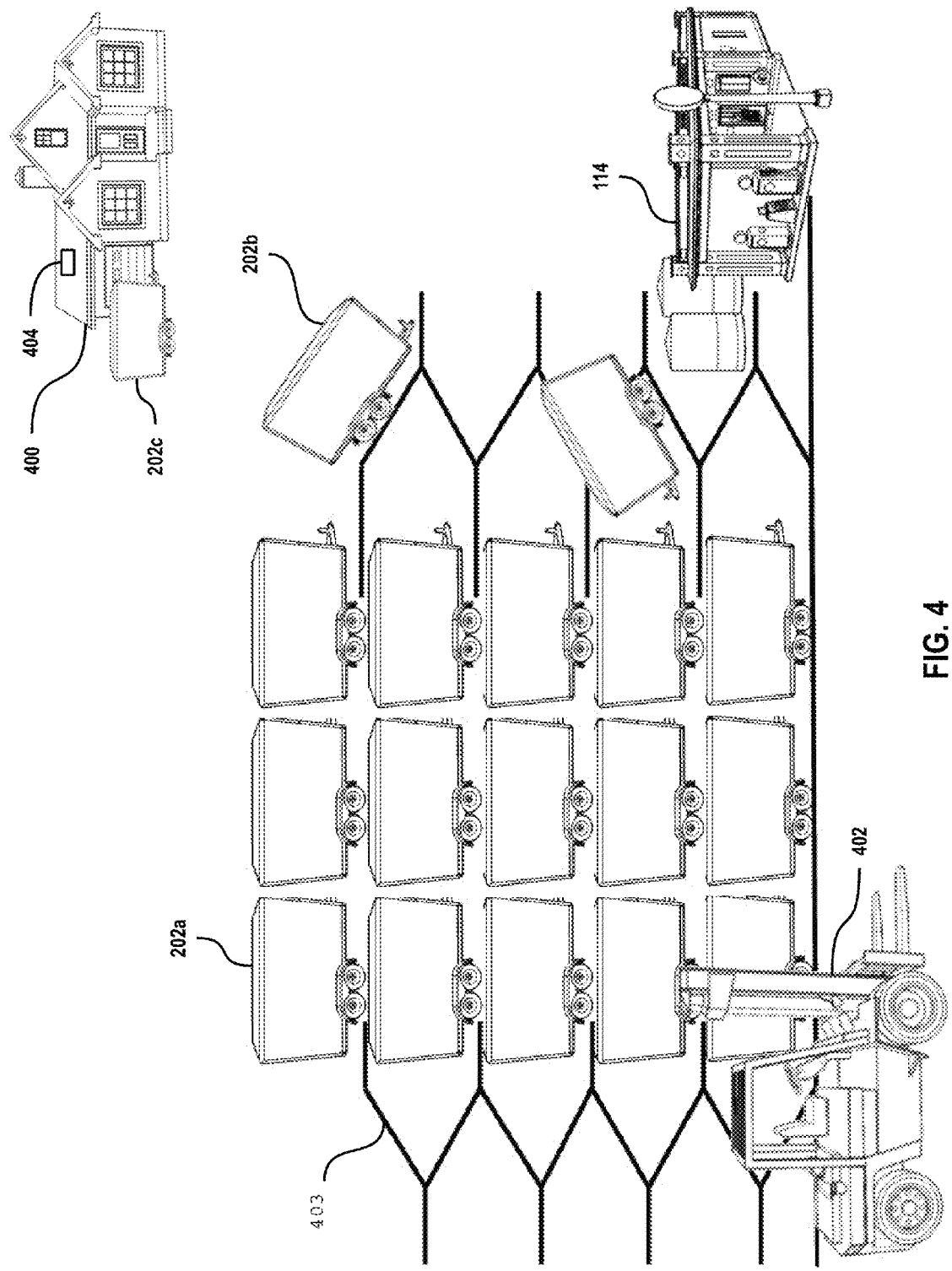
FIG. 4 illustrates an exemplary operating environment of stacking and storage containers and trailers at relay station, parking lots and storage areas, in accordance with various embodiments.

Example Parking, Stacking and Storage of Trailers in a Relay Station or Elsewhere The FIG. 4 illustrates an example of stacking a group of trailers including the trailer 202a. In the relay station 114, which can also be a service station, there is a storage area to handle material and lift cargo. For example, the storage area can have devices, such as the forklift 402 or ramps 403. These device can enable stacking of trailers 202a and/or a group of trailers (e.g., each trailer storing physical items inside) that surround the ramps 403. In the FIG. 4, for example, 15 trailers are stacked up on the platform-ramps 403 and two trailers including 202b, being mobilized on the ramps.

Implementations of platforms with ramps 403 may include, for example: industrial warehouses with heavy pallet racks, steel or concrete structures, parking lots at ground level, parking buildings, multilevel/multistory underground parking, open parking areas, cantilever type of shelve, or any combination thereof. Some examples of means for stacking trailers including, for example: forklift 402, ramps 403 as used by the trailer 202b, cranes, hydraulic lift platforms, or any combination thereof. If platforms have ramps 403 are used, an operator can utilize a means for pushing or pulling including, for example: winches, tow vehicles, forklifts, elevators, hydraulic platforms, or any combination thereof, to move cargo load and/or the trailers.

Using trailers not only for transporting goods, but also to store them, can increase the speed of delivery and save cost. For example, a manufacturer, rather than loading up a 28-foot trailer and shipping it to a distribution warehouse, can fragment the same amount of goods into four smaller trailers. Each trailer can be shipped directly to the distribution area instead of shipping the entire cargo-load to a distribution warehouse and from there, unloading, storing, re-loading and shipping the goods to distribution areas. The use of the warehouse, storage facilities and handling equipment of goods would be avoided or reduced. In turn, increase of the speed of cargo delivery is achieved by being able to park or stacked up trailers near of areas of consumption or processing.

For example in FIG. 4 illustrates how to use the parking area in front of the garage of the house 400 to save the contents of the trailer 202c. If, for example, a retailer wants to stock up on merchandise that is in the trailer 202c, and the retailer can ask a last mile (LM) operator to tow the trailer and restock inventory. The retail store would be located a few miles from the house 400 where merchandise is stored in the trailer 202c. Thus, the manufacturer reaction is almost immediate on meeting the demand for retail products or services, while saving fuel and storage costs making the whole supply chain simpler and more productive. Additionally, the house 400 can have a relay station control unit (RSCU) 404, which can constantly track the trailers, the integrity of the chain of custody, and therefore control and supervise of the goods stored in the perimeter of the house. Thus the manufacturer, retailer and all those involved in the supply chains maintain inventory control and movement of inventory at all times and places.

Example Block Diagram and the Operating Environment of the Network of Devices and IT Infrastructure for Deploying the Services Offered.

Figure 5:
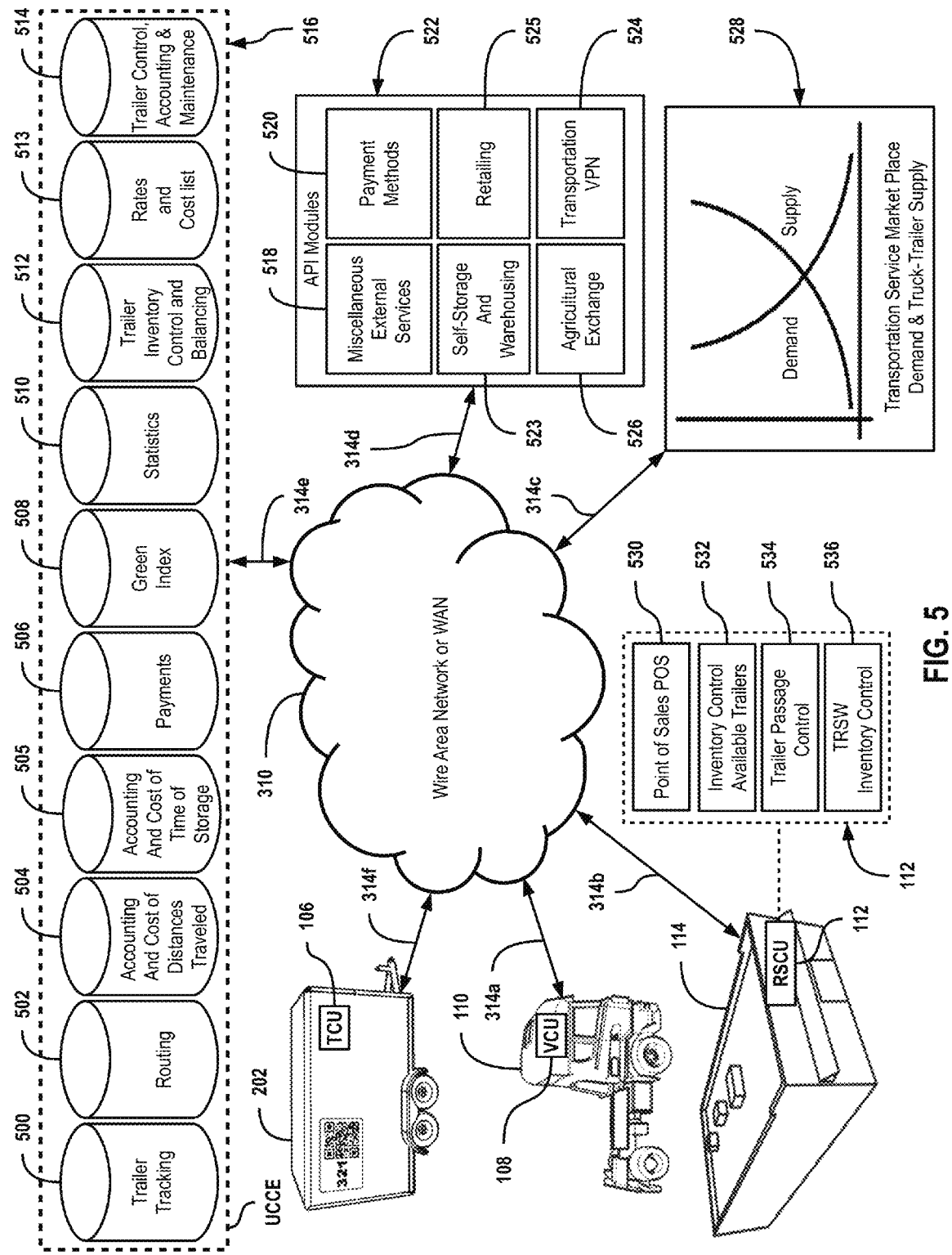
FIG. 5 is a block diagram of an exemplary network operating environment for devices implementing services offered, in accordance with various embodiments.

FIG. 5 illustrates network elements and computer resources that enable implementation of numerous services offered by the trailers, tow trucks and relay stations. The basic elements of the transportation network and storage of FIG. 5 can be the trailer 202, tow/transportation truck 110 and relay station 114. The services described in FIG. 5 can each be implemented by one or more engines, modules, or sub systems, or be combined in any number of ways with each other into one or more engines, modules, and/or sub systems.

The control units of each basic element, such as TCU 106, VCU 108 and RSCU 112, can be connected to the wide area network 310, such as the Internet, using more than one simultaneous wired and wireless connections or networks available, such as links 314f, 314a and 314b. If the connections are wireless, receivers and transmitters can use radio frequency devices or optical devices (e.g., infrared links or FSO —Free Space Optics—). A radio frequency implementation of these links can include, for example, using a GSM, GPRS, CDMA, EDGE network, a wireless LAN network like WiFi, WiMAX, 3G or 4G cellular network, or any combination thereof. Links can also use wireless technology peering devices or P2P (Peer to Peer) connections, such as Bluetooth, NFC networks (Near Field Communications), IOT (Internet of Thing), or any combination thereof. In some embodiments, the links can be wired technology, for example, USB (Universal Serial Bus) ports, Ethernet LAN networks and ports, optical fiber networks, gigabit-Ethernet, or any combination thereof. The wired and wireless links may be operating simultaneously in order to increase the reliability of the connection of the control unit TCU 104, VCU 108 and RSCU 112 to a wide area network, such as the Internet.

As an example, FIG. 5 illustrates how the applications of the RSCU 112 can work together with the link 314b to connect to the wide area network 310. The RSCU 112 can contain applications, for example, POS (Point Of Sales) 530, inventory control of trailers available 532, passing trailers control 534, (Transportation, Retail, Storage, Warehousing) TRSW inventory control 536, or any combination thereof.

TRSW status variable can keep an inventory of trailers, which are used for retailing, warehousing, transportation and/or storage. The POS application 530 can include, for example, executable engines that liquidate the cost of a shipping service and/or provide logistical warehousing or temporary storage services of a trailer (e.g., as used by the transportation network). To calculate, for example, the number of miles and the corresponding income per truck-driver for each segment of the route, the POS application 530 can access the RSCU 112 as well as the centralized data storage service 504 that counts the amount of miles/kilometers covered for each trailer. With this information, the total cost/income of the service as well as the cost/income per truck is calculated. When the service is canceled, the transaction is recorded in the service payment processing and storage 506. The 506 service also records a weighted basis, the payments to each operator or truck-driver set. The POS application 530 can settle and also record the total or partial payment of the rent of a trailer used for storage and update such payment through the wide area network by accessing the general information control service 516 to update the corresponding databases. To settle the storage service cost/income, the POS application 530 can query the storage processing information service 505. The 505 service keeps track of time and the storage locations of each trailer used for self-storage or warehousing network. So the POS application 530 may clear the shipping and storage service consulting to 504 and 505 services for a trailer that travels from point A to point B and somewhere in between and also the trailer which stays parked for storing the cargo inside.

The RSCU 112, can contain the inventory control application for available trailers 532, which monitors the entry and exit of trailers that are stored in the relay station 114 for rent. Thus, the general information control service 516 through the inventory balancing and control service 512, updated in real-time inventory levels of trailers available for each relay station that makes up the network. The inventory balancing and control service 512 can maintain the inventory of trailers of all relay stations available as well as the characteristics of each trailer. Also projects the optimal amount of trailers for each station by using the following methods including but not limited to: historical data, statistics, and seasonality of demand patterns, random events, demand patterns derived from analysis of multiple variables among others. The inventory balancing and control service 512 can determine the optimal inventory level per station and offer different scenarios and strategies to balance inventory levels in the network. For example, if a relay station lacks trailers which a nearby relay station has, the service 512 can highlight the imbalance and propose transporting leftovers trailers from the surplus station to the deficit station or where demand for trailers exists. Another strategy is to use the tariffs that encourage sending trailers from a station with surplus to a station with deficit or to another place where there is demand for trailers. This inventory balancing process works, when service 512 takes the prices quoted by the service 513 and suggest a discount based on location so an economic incentive is introduced for picking up trailers in different relay stations nearby. The service 513 can store geo-referenced prices from all the services offered by the network (transportation, self-storage, warehousing, retail) along with discounts that could be used under previously established circumstances, including tariff discounts for inventory balancing reasons between relay stations as explained before.

The service 512 that provides a service for controlling and balancing the number of trailers can have many other strategies to meet the trailers at relay stations that make up the network, strategies such as: reciprocity, diffusion, extended trailer pick-up area, direct transfer, complementary routes, or any combination thereof. Reciprocity refers to the strategy of assigning cargo-load to a truck with a commitment to mobilize available/empty trailers in a certain direction. Dissemination means that a LM operator that carries a trailer to the final destination, must return it empty to a different station where there is a deficit or demand for trailers. Extended trailer pick-up area means traveling to the relay station with the largest number of available trailers rather than the nearest station to pick up a new trailer. Direct transfer means move trailers directly from a station with surplus to a station with deficit or where demand for trailers exist. Complementary routes means using distribution fleet backhauling routes to balance trailer inventories between different relay stations. All these strategies can be implemented interactively using the data and services described in FIG. 5.

The costs of any optimization strategy may depend on the calculation that make services 504 and 505 which in turn consult the data contained in the service 513, where rates of all services are stored according on the service area. The RSCU 112 contains a service called trailer passage control 534, used to record the passage of all trailers transiting or stopping at the perimeters of the relay station 114. If a group of trailers or a single trailer passes close to a relay station 114, antennas of different communications systems can be alerted to identify both the trailer and the tow/transportation trucks that are part of the network. Regardless of the service being met by the trailers and if the current relay station is used or not, the passing trailers control 534 can store the event and transmits it to the service 500 where the location of all network components are updated on a general level. The service 500, stored and updated in real time positions, speeds and movements of all the trailers and trucks at local, municipal, state, national and international level.

The function of the general information control service 516 can be to update the various computer services so that the movement of trailers and trucks are registered in a double-entry record system. That is, any change in the balance of trailers registered in a database must be matched by an equal change in another database. For example if a trailer is empty, then it should be posted on the 512 service. If the trailer is used for transportation, the balance in the service 512 should decrease a unit and proportionally increase the balance in the service 504, where the distance is calculated to figure out at the end, the cost of the service and the income distribution among trucks/drivers which integrate the transportation chain. If the trailer is used for self-storage or warehousing, then a decrease in the balance of service 514 must reflect a commensurate increase in the service 505 where the storage time and cost of the service is computed.

The RSCU 112 can have the TRSW inventory control 536 carrying the inventory level of trailers that are stored or parked in the relay station 114 and are executing one of the following functions: Transportation, Retail, Self-Storage or Warehousing (TRSW). Like other databases and services which use double-entry system, inventory movements that affect TRWS also affect the balances of the services 504, 505 and 512.

The general information control service 516 can use the link 314e to connect to the wide area network 310 like Internet and thus exchange information with all services and network members. The service 502 can be part of the general information control service 516 and establish the routes of truck-trailer sets to get from one relay station to another relay station until the final destination is reached. The service 502 and the service 512 can work together by setting transportation routes for trailers that have to be moved from relay stations where empty trailers are available to relay stations or places where trailers are needed. The service 502 can maintain route information, which is updated in real time, so trucks and trailers do not have delays while traveling due to bad weather, accidents, traffic jams, works on roads, among other events. By coordinating and setting transportation routes, it is possible to implement various routing protocols as the nodes or routers of digital networks do while connecting to Internet. It is possible to implement adaptive or static protocols as in digital networks. Adaptive protocols, such as RIP (Routing Information Protocol), OSPF (Open Shortest Path First), IS-IS (Intermediate System to Intermediate System), IGRP/EIGRP (Enhance/Interior Routing Protocol Gateways), or any combination thereof.

Although digital network protocols as mentioned can be adapted, it is also possible to develop more suitable protocols for use in transportation and storage of trailer as illustrated in FIG. 5. It is desirable to design and use different protocols for both segments: LM segments and trunks. Segmentation or quantization of transport routes in discrete units/segments and quantization of cargo-load in discrete units by using trailers for transportation and storage, opens the possibility of applying algorithms and routing schemes used by digital packet switched networks optimizing resources all over the network of services providers. Drawing a parallel again with digital telecommunications networks, it may be convenient to use protocols in LM areas inspired by LAN and MAN networks such as Ethernet protocol that connects nodes using multipoint topologies which allow to handle digital traffic of random nature. On the other hand, point-to-point networks use protocols such as ATM and SONET that handle large amounts of data and information traffic in a more predictable manner. So these protocols are used as a framework to design transportation protocols to be implemented on trunks where point-to-point topologies exist.

The service 508 can be called "green index." The service 508 can count the percentage of green technologies that are used to provide any of the services offered by the network of providers (e.g., transportation, storage, and/or distribution providers). For example, a trailer that is transported from Los Angeles to New York can be towed by more than five trucks. In some segments of the route, trailers may be towed or transported by trucks powered by non-fossil fuels or electrical power. Then the service 508 can calculate how many miles the trailer was pulled by an electric truck, a natural gas truck, a gasoline or diesel truck. Thus, the service 508 may calculate the absolute value of the green miles or as percentage of green miles over the total miles traveled by the trailer within a service cycle of accumulated per any amount of time (day, week, month, year). With a green index, organizations can implement policies that encourage the use of trucks fueled with no fossil fuels or more environmentally friendly renewable energy.

The statistical services 510 can store, classify and/or analyze the information all hardware and information components generate of the aforementioned network of transport and storage of goods and services. By storing all or a subset of the information generated by each physical and information component (e.g., trucks, trailers, relay stations, users, web portal, etc.), it is possible to find behavioral patterns to make better decisions for optimizing the transportation network, designing new services or validating the effectiveness of the innovations introduced to the network, or any combination thereof. The statistical services 510 can enable implementation of better routing schemes, balancing the number of trailers in various relay stations according to seasonal patterns, measure the effectiveness of new models of transportation or routing, optimizing the use of certain types of trailers in certain regions among other possibilities of network performance optimization. Classification and analysis of the stored information, effectively support the implementation of new services or improvements on existing services.

In FIG. 5 also illustrates the service API (Application Programming Interface) 522 which can connect the information technology infrastructure that supports the transportation and storage network with third party software applications. For example, a third party application can access data from any information service that integrates the general information control service 516 to provide statistics or computer services derived from databases grouped in 516. A third party can use the general information control service 516 to provide transportation and storage services of goods and services which are supported by accessing databases from 516. Although third-party applications are intended to use any resource for any type of application, a classification scheme can include, for example: external services (via external services interface 518), payment methods (via payment methods interface 520), self-storage and warehousing services (e.g., via self-storage and warehousing interface 523), retailing (e.g., via retailing interface 525), produce exchange (e.g., via agricultural exchange interface 526), transportation VPN (Virtual Private Network) (e.g., via transportation VPN interface 524), or any combination thereof.

The payment methods interface 520 can serve to integrate means of payment services offered by banks and specialized operators that add a variety of payment services in one platform. Thus, a third party can offer payment alternatives for the transportation and storage service network, adapting payment methods to user preferences or customer segments in each region of a country or certain individuals within a specific region. Additionally the payment methods interface 520 can facilitate the use of innovative payment methods which are most convenient or economical than traditional payment alternatives. The self-storage and warehousing interface 522 can relate to specialized applications for self-storage and warehousing of goods and services which allow third parties to use the information technology and physical infrastructure of the network, to create new IT (Information Technology) services and new storage or warehousing of goods and services across the network.

The retailing interface 525 can facilitate the development and implementation of new services in retailing. With the physical infrastructure represented by the trailers, tow/transportation trucks and relay stations, a third party can design new and innovative retail services that enable deliver products and services in minimum time and at competitive costs. New ways of doing e-commerce and new ways of complementing traditional retail services can be developed throughout the deployed network infrastructure and the retailing interface 525. Trailers with vending machines and inventory control software can offer retail alternatives to both urban and rural populations. The agricultural exchange interface 526 can implement transportation, storage and distribution networks of perishables like agricultural and livestock products. Perishable goods may demand special trailers and routes as well as fast delivery. Once these specialized transportation and warehousing services are in place, it is possible to integrate them with commodity exchanges that exist in different countries.

For example, a load of fruits may traditionally use of large trucks, containers and warehouses. According to several embodiments, these large trucks can be replaced by the use of smaller trailers being sent directly to the end consumer so considerable savings are achieved in the supply chain. The use of warehouses, storage equipment and labor would be reduced. The trailer would serve as means of transport, storage and delivery of products integrating the entire supply chain. Costs along the supply chain would decrease by such factors as: faster delivery, lower management costs by the simplicity of the overall process, lower transportation and warehousing cost, less waste, lower cost of intermediation between producers and consumers, among other factors.

The transportation VPN interface 524 can serve to integrate third party applications by implementing dedicated paths or "virtual tunnels" between a place of origin and a place of destination. VPN ensure that the trailers travel fulfilling certain delivery and cargo handling conditions (delivery time restrictions, specialized trailers, use specialized loading and unloading conditions, moisture and temperature control inside the trailers, among other options) as established by the parties on a contract or a definition of terms of service. The trailers that work under this mode may be engaged and disengaged under certain time delivery conditions so it may seem that a road or exclusive tunnel was made between the source and destination despite the fact that transportation and storage of trailers is done by a group of companies or operators without any labor or corporate ties.

The interfaces API 522 can handle variables and network resources to provide the highest standards of service. The interfaces API 522 can create a variety of services to specific segments in the industry. The interfaces API 522 can create highly customized services tailored to a customer group or industry despite having resources arranged in an open network of providers and operators. Any other service implemented by third parties that are not classified within the interfaces 520, 523, 524, 525, 526 can be coordinated by the external services interface 518. The interfaces API 522 can be connected to the wide area network 310 through the link 314d that can be implemented in wired or wireless manner.

FIG. 5 also shows the service 528 where supply and demand for the services provided by the network are found and converge in one place. In some embodiments, the service 528 implements a website where a client requests shipping service from a point of origin to a destination. The LM operators can receive the request on the website of the service 528. The LM operators can be responsible for meeting this requirement by sending a trailer. The request may originate from the website but also through other channels, such as a phone call, a text message, a kiosk installed on the premises of a retailer or a relay station, a mobile app on a tablet or smart-phone, the same screen of a trailer or a wireless link of the trailer, or any combination thereof. All or a portion of the details of the service may be available by accessing the various computer components and services described in FIG. 5 using the same facilities to originate the service, such as website, phone call, kiosk, tablet, smart-phone, trailer terminal, or any combination thereof.

Example Trailer Control Unit —TCU— Architecture

Figure 6:
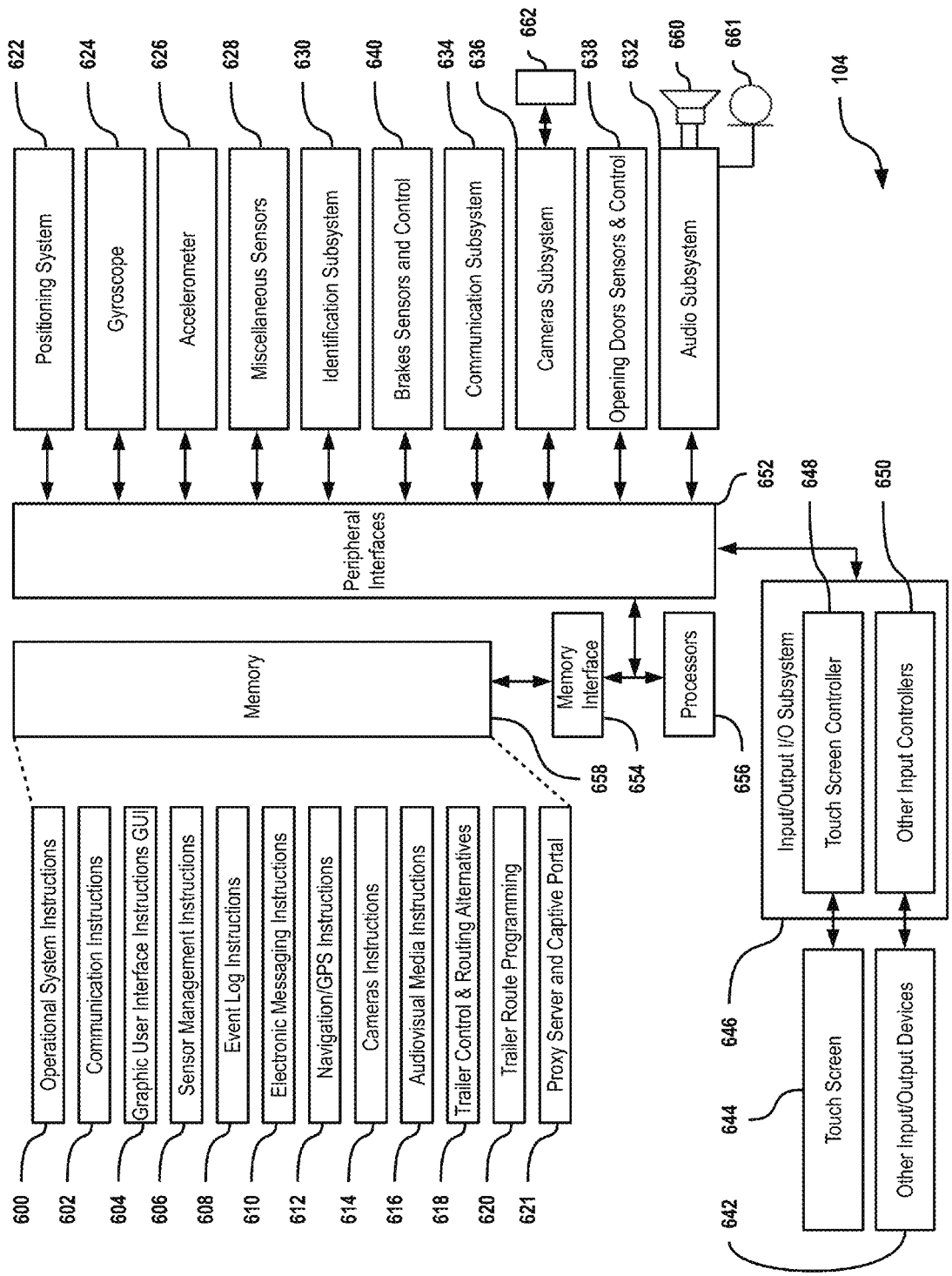
FIG. 6 is a block diagram of an exemplary device architecture of trailer/container control unit, in accordance with various embodiments.

FIG. 6 is a block diagram of the architecture of the TCU 104, which enables the implementation of transportation, warehousing, self-storage and retail services throughout the coverage area of the service network. The TCU 104 may include a memory interface 654, one or more central data processors and/or images processor 656 and the peripheral interface 652. The memory interface 654, the central data and/or images processor 656 and the peripheral interface 652 may be separate units or they can be clustered in one or more integrated circuits. The different components of the TCU 104 can be coupled by one or more data buses or communications lines. Transducers, sensors, devices and subsystems can be coupled through the peripheral interface 652 to incorporate different functions.

Functions multiplicity or complexity of the TCU 104 may depend on the complexity of the trailer or the cargo to be carried, the value or size of the load, or the required level of service offered, the trailer requirements and cost of components, among many other factors. The TCU 104 may be implemented with more or less transducers, more or less sensors, more or less devices, more or less subsystems to suit the needs of, for example, the trailer, the type of cargo-load in particular or the transportation network (e.g., network of providers for transportation, storage, distribution and/or retailing of cargo).

For example, the positioning system 622, the accelerometer 626 and gyroscope 624 can be coupled to the peripheral interface 652 to facilitate the implementation of functions like monitoring and location of mobile objects such as trailers with or without line of sight (estimated navigation or dead reckoning) to the GPS (Global Positioning System) satellites. In some implementations, the gyroscope 624 and accelerometer 626 may indicate whether a trailer is rolling on a road with slope or if the trailer is overturned. In other implementations, the accelerometer 626 and/or the gyroscope 624, for example, can feed their sensor data to an electronic brake control system to prevent oscillations (trailer sway) of trailers towed and impacted by strong crosswinds. Multiple/Miscellaneous sensors 628 can connect multiple devices to the peripheral interface 652, the sensors 628 such as: thermometers, humidity sensors, biometric sensors, pressure gauges, magnetometers, or any combination thereof. Thermometers or thermocouples can measure the temperature inside the trailer and thus monitor the conditions of storage and transportation of temperature sensitive goods. In another example, humidity sensors can measure and/or control the moisture level within the trailer. Biometric sensors can control the opening of doors or handling of door locks or locking drawers inside the trailer. Sensors, such as magnetometers, pressure gauges, gas sensors, antennas, among many other types of measurement sensors, can facilitate measurement and implementation of the related variables.

For example, positioning or georeferenced information can be received by the TCU 104 through the positioning system 622. In various implementations, positioning system 622 may be incorporated into the TCU 104 or may be an external device connected through a wired or wireless link. In some implementations, the positioning system 622 may include a GPS receiver together with a processing unit to take the position signals from the GPS satellites to find out the geographical position. In other implementations, the positioning system 622 may incorporate an electronic/magnetic compass, an accelerometer and a positioning engine in order to determine the geographic location via dead reckoning techniques when line of sight to receive signals from satellites or cell phone antennas is not available. In other implementations, the positioning system 622 may use wireless signals (e.g., signals IEEE 802.11 wireless or —WiFi—) to determine the location information or even use hybrid techniques that combine satellite signals and television-radio broadcasting signals. In other implementations, positioning system 622 may include a GLONASS receiver (GLObalnaya NAvigatsionnaya Sputnikovaya System in Russian, Global Navigational Satellite System in English) and/or GALILEO (European satellite positioning system) and/or DBS (BeiDou Navigation Satellite System) along with a processing unit to take the position signals from satellites of the GLONASS and/or Galileo and/or DBS systems for finding the geographic position.

The identification subsystem 630 can label and identify a particular trailer and the characteristics of the TCU 104. For example, the identification subsystem 630 can add information that identifies the distinctive components integrating with the trailer and the TCU 104. Information, such as MAC (Media Access Control Address) address of the Ethernet port embedded in the TCU 104, the bar-code printed on the TCU 104 board, the RFID chip contained on the TCU 104, the dynamic or static IP (Internet Protocol) address taken by the trailer at a given moment, exclusive keys and encrypted codes for trailers or the TCU 104, event log that creates a unique fingerprint to identify the trailer, or any combination thereof, can be used to create a unique identifier or fingerprint of a trailer (e.g., utilizing one or more hashing techniques). This can be done to enhance the safety of transportation and storage of cargo and ongoing monitoring of each trailer throughout the service area.

Maintaining the chain of custody in an open network of transportation, storage, distribution and retailing with trailers/containers, can constitute a mission critical function for active elements, such as the TCU 104. All or a subset of identification information of trailers and the TCU 104 can be transmitted with or without encryption at any time through the communication subsystem 634. This can be done to track the trailer and its contents throughout the service area of the network and check if the TCU 104 has not been altered or changed and thus ultimately determine the identity of the trailer.

The audio subsystem 632 may be connected to the speaker 660 and one or more microphones 661. The audio subsystem 632 along with the input/output subsystem 646 can be integrated to interact with a user using the touch screen of the TCU 104 through gestures and voice commands. For example, this interaction with the user may trigger a request for general or specific information of service network or trailer service status (e.g., to be displayed by the touchscreen or another display).

Communication functions can be facilitated by one or more communications subsystem 634. The communication subsystem 634 may include one or more wireless communications subsystems or one or more wired communication subsystems. Wireless communication subsystems may include receivers and transmitters of radio frequency and/or optical (e.g., infrared, laser) receivers and transmitters. The wired communications subsystem may include a serial bus port like a USB (Universal Serial Bus) port or other wiring links which connect computing devices, such as networking equipment, switching or network access devices, personal computers, printers, flat screens or other devices capable of receiving and transmitting data, or any combination thereof.

The specific design and implementation of communications subsystem 634 may depend on communications networks or media on which the TCU 104 can operate. For example, the TCU 104 may include a wireless communication subsystem designed to operate on a GSM (Global System for Mobile communication, English) network, an EDGE (Enhance Data GSM Environment English) network, 802.X (e.g., Wi-fi, WiMAX or 3G) networks, CDMA (Code Division Multiple Access in English) networks and Bluetooth networks. The communications subsystem 634 may include protocols for managing a server or hub-type communications device (hosting protocols) that serve as a base station for other wireless devices. The communications subsystem 634 can enable the TCU 104 to be synchronized with a network device using one or more protocols such as TCP/IP, HTTP, UDP or other well-known protocols.

The camera subsystem 636 and the optical sensor 662 may be used to facilitate camera functions, such as taking pictures or videos inside or outside the trailer. The camera subsystem 636 can thus support maintaining the chain of custody of items to transport, store, distribute or sell in an open network of operators, enterprises and/or individuals who work independent of any corporate or labor bond component. The optical sensor 662 can includes, for example, the use of technologies, such as CCD (Charged Coupled Device) or CMOS (Complementary Metal-Oxide Semiconductor). Camera subsystem 636 can be connected to one or more optical sensors, which are integrated or external to the TCU 104. A camera system can send photos or videos of the inside of the trailer automatically or on demand. The TCU 104 can send pictures or videos of external cameras for checking traffic conditions, weather, location of the trailer, surveillance, and/or other purposes.

The sensor and door opening subsystem 638 can enable monitoring and control of various actuators, which can be operated to close or open, for example, doors, locks, securing-releasing accessories attached inside or outside the trailer, or any combination thereof. The sensors and door opening subsystem 638 can control and monitor among others the following: vents, windows, doors, floor/ceiling/wall locks, padlocks, on/off or status signal detector for doors, windows, ducts and locks.

The sensor and brake control subsystem 640 can monitor and control the brakes of the trailer. The sensors can measure the effectiveness of the brakes and the status of essential components, such as hydraulic circuits (if the brakes are hydraulic), electrical circuits (if the brakes are electric), state of abrasives (bands or pads), or any combination thereof. The subsystem of sensors and brake control subsystem 640 can control the activation of brakes on all wheels of the trailer together or separately. The brake control subsystem 640, for example, can control trailer oscillations due to the wind. The brake control subsystem 640 can adapt or adjust the brakes due to the effective against the weight of the payload and/or incline of the road which uses the trailer.

The input/output subsystem 646 may include a touch screen controller 648 and/or an input controller 650. The touch screen controller 648 may be coupled to the touch screen 644. The touch screen 644 with touch screen controller 648 may detect contact, movement or gestures applied to the surface of the touch screen 644 using the touch sensitive technologies including but not limited to: capacitive, resistive, infrared, surface acoustic wave technologies, diverse arrays or matrices of proximity sensors as well as other factors determining one or more points of contact on the touch screen 644 or in the vicinity of the touch screen 644. Other input drivers/controllers may be coupled to other control devices and input 642 through one or more keys or buttons, rocker type switches, thumb-wheel, infrared port, USB port or a pointing device such as an electronic pen. The push buttons keys can also include audio volume control for both the speaker 660 and the microphone 661. In some implementations, the TCU 104 along with the audio subsystem 632 and touch screen 644 can record and play audio and video including formats like MP3, AAC, MPEG, MP4 or any combination thereof.

The memory interface 654 is coupled to memory 658. The memory 658 may include high speed RAM (Random Access Memory) and/or one or more volatile magnetic memory hard disks, one or more optical storage devices or FLASH type memory (e.g., NAND, NOR memory type). The memory 658 may store the operating system 600 as: Linux, Unix, OSX, Windows, Android, RTXC, Darwin, IOS or also VxWorks embedded system. The operating system 600 may include instructions for handling basic system services for the TCU 104 or run exclusive tasks of the TCU 104 hardware. In other implementations, the operating system 600 can include only of a one core kernel of a standard operating system (e.g., Unix kernel).

The memory 658 may store communication instructions 602 to facilitate communication with one or more additional devices, one or more computers, one or more servers, one or more mobile devices, or any combination thereof. The communication instructions 602 can be used to select the operating mode or means of communication used by the TCU 104, based on the geographical location obtained by navigation instructions/GPS device 612.

The memory 658 may store graphical interface instructions (GUI) 604 to facilitate graphical interface (GUI) processing; sensor operating instructions 606 to facilitate sensor processing and functions; event storage instructions 608 to facilitate events storage-related processing and operations; emails instructions 610 to facilitate email processing and functions; navigation instructions 612 to facilitate GPS navigation processing and operation; cameras associate instructions 614 to facilitate camera processing and functions; the audiovisual media system instructions 616 to facilitate related audio/video system processing and functions; trailer control and route alternatives instructions 618 to facilitate processing-related processes and features described with reference to FIG. 1A, FIG. 1B and its operation; trailer route programming instructions 620 to facilitate processing related processes and features described with reference to FIG. 1A and FIG. 3 and its operation; or any combination thereof.

The memory 658 may also store other software instructions, such as web video instructions to facilitate the processing associated with video on the web and functioning and/or commerce web instructions to facilitate processing related web commerce and its operation. In some implementations, the instructions of audiovisual processing 616 are divided into instructions for processing audio and video separately to facilitate the calculations in the processes related to audio and its functions and processes related to video and its functions, respectively.

Proxy and captive portal server instructions 621 can serve to facilitate the processing related to the proxy server and its operation as well as the captive portal and its operation, respectively. With the proxy server, for example, a smartphone user can approach the trailer and TCU 104 to navigate through Internet using wireless links between the trailer and the user. The trailer can be connected to the Internet using another wireless link that bridges between the user device and the Internet network. The captive portal, for example, can transmit local websites that advertise and/or sell products or services, or provide information about users, who approach the trailer and the TCU 104 without Internet access. The captive portal content can be stored locally in memory 658.

Each of the instructions and applications identified above may correspond to a group of instructions that execute one or more functions described. These instructions are not necessarily implemented as separate pieces of software or divided into processes or modules. The memory 658 may include or contain additional instructions to those related in FIG. 6 or may be less instructions related in FIG. 6. In addition, many functions of the TCU 104 may be implemented in hardware or software using one or more processors signals and/or specialized circuits for each application.

Example Vehicle Control Unit —VCU— Architecture

Figure 7:
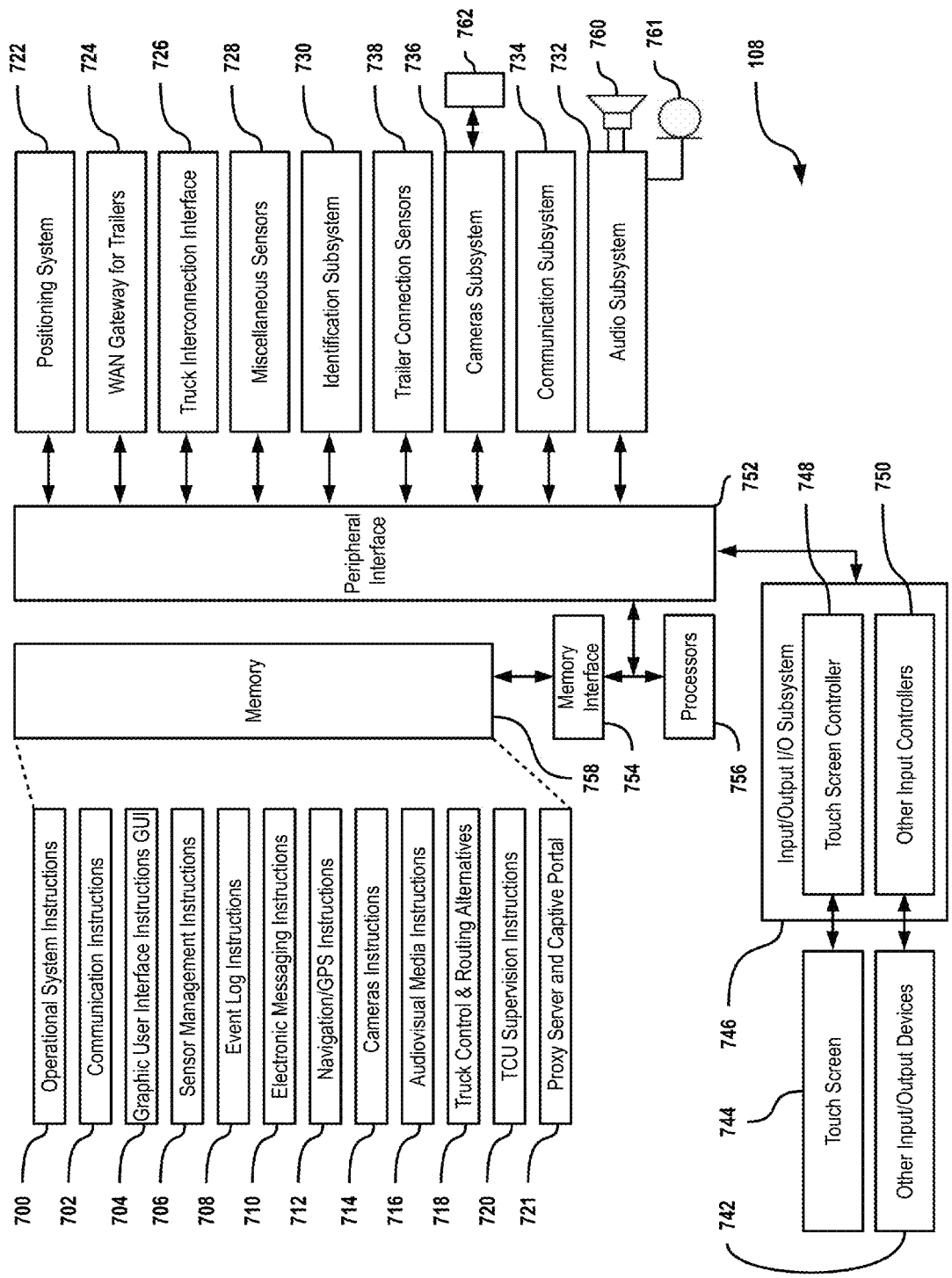
FIG. 7 is a block diagram of an exemplary device architecture of tow/transportation vehicle control unit, in accordance with various embodiments.

FIG. 7 is a block diagram of the architecture of the tow/transportation vehicle control unit VCU 108, which enables the implementation of transportation, warehousing, self-storage and retail services throughout the coverage area of the service network. The VCU 108 may include the memory interface 754, one or more central data and/or images processors 756 and peripheral interface 752. The memory interface 754, the core data and/or images processor 756 and peripheral interfaces 752 may be separate units or may be grouped in one or more integrated circuits. In turn the different components of the VCU 108 may be coupled by one or more buses or communication lines. Transducers, sensors, devices and subsystems can be coupled through the peripheral interface 752 to incorporate different functions.

The multiplicity of functions or complexity of the VCU 108 can depend on, for example, the complexity of self-propelled transportation vehicles used to engage and transport a trailer or a group of trailers, the complexity in handling the material to be transported and/or stored, the cargo-load value or size, the level of service required or offered, cost requirements of VCU 108 and its components, among other factors. The VCU 108 can be implemented with more or fewer transducers, more or less sensors, more or less devices, more or less subsystems to suit the needs of the use of self-propelled transport and type of cargo in particular; or service network of transport, storage, distribution and retailing in general.

A WAN gateway 724 can connect a trailer and/or a vehicle to the Internet. For example, the WAN gateway 724, the vehicle interconnection interface 726, and communication subsystem 734 can be coupled to the peripherals interface 752 to facilitate the implementation of communications functions between trailers and a remote station. The transportation system can monitor the movement of both the trailer and the tow/transportation vehicle at all times and places. The WAN network can connect in turn to the Internet network enabling monitoring of trailers and tow/transportation vehicle from anywhere in the world. In some implementations, the vehicle interconnection interface 726 along with the WAN gateway 724 may monitor cargo-load conditions containing each of the trailers as well as the geographical location of truck-trailers set at all times and places.

The vehicle interconnection interface 726 can enable the transfer of information between the VCU 108 and trailer TCU. So any variable or function generated by any TCU could be accessed from anywhere in the world through the vehicle interconnection interface 726 and WAN gateway 724 of the VCU 108 or the TCU 104. The vehicle interconnection interface 726 can have enough wired and wireless ports to connect with every trailer's TCU by using corresponding wired and wireless links available on each TCU. The communication subsystem 734 can be implemented using cables and corresponding wired ports. This can involve the use of USB ports and cables, Ethernet ports and cables, fiber optic, Giga-Ethernet ports, or any combination thereof. In some implementations, a wireless port can be used simultaneously or as a unique means of communication. In some implementations, for example, technologies such as Bluetooth, 802.X ports or GSM and GPRS ports can be used among others wireless communication technologies.

Multiple/Miscellaneous sensors 728 can connect multiple devices to the peripheral interface 752 including but not limited to: thermometers, humidity sensors, biometric sensors, pressure gauges, magnetometers, or any combination thereof. Thermometers or thermocouples to measure the temperature inside the truck or also monitor the conditions of storage and transportation of temperature sensitive goods when the cargo or trailers do not have sensors of this nature. Also humidity sensors for measuring and controlling the moisture level within the trailer and/or truck. Biometric sensors to control the opening of doors or handling of door locks or locking drawers inside the truck or access to the information stored in the VCU 108. Sensors such as magnetometers, pressure meters, gas detectors, antennas, among many other types of sensors facilitate the measurement and implementation of functions that need to measure the variables in both the truck and the load it carries.

The position information can be received by geo-referencing the VCU 108 through the positioning system 722. In various implementations, the positioning system 722 may be incorporated to the VCU 108 or an external unit can be connected via a wired or wireless connection. In some implementations, the positioning system 722 may include a GPS receiver together with a processing unit to take the position signals from the GPS satellites to find out the geographical position. In other implementations, the positioning system 722 may include an electronic or magnetic compass, an accelerometer and a positioning engine in order to determine the geographic location through the dead reckoning technique when line of sight to receive signals from satellites or cell phone antennas is not available. In other implementations, the positioning system 722 may use wireless signals (signals IEEE 802.11 wireless or —WiFi—) to determine the location information or even use hybrid techniques that combine satellite data and radio-television radio broadcasting signals. In other implementations the VCU 108 may obtain the geographic position by accessing one or more trailer TCU. In other implementations, positioning system 622 may include a GLONASS receiver (GLObalnaya NAvigatsionnaya Sputnikovaya System in Russian) and/or GALILEO (European satellite positioning system) and/or DBS (BeiDou Navigation Satellite System) along with a processing unit to take the position signals from satellites of the GLONASS and/or the Galileo and/or the DBS systems for finding the geographical position.

The identification subsystem 730 can be used to label or identify the tow/transportation vehicle, the driver, characteristics of the VCU 108, distinctive components that integrate with the vehicle and/or the VCU 108, or any combination thereof. The identification subsystem 730 can identify information, such as the MAC address (Media Access Control Address) of the Ethernet port on the VCU 108, the bar-code printed on the VCU 108 board, the RFID chip containing the VCU 108, the dynamic or static IP (Internet Protocol) address taken by the vehicle at a given moment, exclusive keys and encrypted codes used for the truck, the driver or the VCU 108 event log, or any combination thereof.

The identification subsystem 730 can generate information, which creates a unique fingerprint to identify the vehicle and/or the driver utilizing one or more techniques. Creation of the unique identifier can enhance the safety of transport and storage of cargo. The unique identifier can also support monitoring (e.g., real-time constant monitoring) of each trailer and truck across the service area. All information identifying the truck and the VCU 108 can be transmitted with or without encryption at any time via the communication subsystem 734. This can be done to track the truck, trailer and its contents along and wide area network service and check if the VCU 108 has not been altered or changed and thus determine the integrity of data and operation of the VCU 108 and the identity of the truck and the driver.

In some implementations, the VCU 108 along with other components of the service network may determine when and where the liability of the driver of the tow/transportation vehicle and the other members of the service network begins and ends. This feature can facilitate cases of accidents, loss-damage third party liability, loss-damage of cargo in transit, theft and other kinds of events where driver-truck can suffer economic or legal consequences. Many operators and companies may work for an open service network (e.g., transportation, storage, and/or distribution service network, herein sometimes referred to as "transportation network") as illustrated in FIGS. 1A and 1B FIG. by hourly, daily, part-time basis. The transportation system implementing the open service network can establish when and where liability begins for each member of the service network.

The audio subsystem 732 can be connected to a speaker 760 and one or more microphones 761. The audio subsystem 732 along with the input/output subsystem 746 would work together to interact with the truck driver or any user close to the truck, who is using the touch-screen unit of the VCU 108 and voice-response commands. This can be done in order to request general or specific information of the service network or the service status of trucks and trailers. In other implementations, the audio subsystem 732 can enable the truck driver to communicate with the central office or any other destination like calling through a mobile phone.

Communication functions can be facilitated by one or more communication subsystems 734. The communication subsystem 734 may include one or more wireless communication subsystems or one or more wired communication subsystems. Wireless communication subsystems may include receivers and transmitters of radio frequency and/or optical (e.g., infrared, laser) receivers and transmitters. The wired communication subsystems may include a serial bus port like USB (Universal Serial Bus) port or other wiring links which connect devices such as networking equipment, switching or network access devices, personal computers, printers, flat screens or other devices capable of receiving and transmitting data. The specific design and implementation of communication subsystem 734 may depend on communications networks or media on which the VCU 108 will operate. For example, the VCU 108 may include a wireless communication subsystem designed to operate on a GSM (Global System for Mobile communication) network, an EDGE network (Enhance Data GSM Environment) network, 802.X (e.g., Wi-Fi, WiMAX or 3G) networks, CDMA (Code Division Multiple Access) networks and Bluetooth networks. The communication subsystem 734 may include protocols for management server or hub-type communication device or hub (hosting protocols) and thus serve as a base station for other wireless devices. Another example would be that the communications subsystem 734 can enable the VCU 108 being synchronized with a network device using one or more protocols such as TCP/IP, HTTP, UDP or other well-known protocols.

The camera subsystem 736 and the optical sensor 762 may be used to facilitate camera functions like taking pictures or videos inside or outside the truck. The optical sensor 762 includes but is not limited to the use of technologies CCD (Charged Coupled Device) or CMOS (Complementary Metal-Oxide Semiconductor). Camera subsystem 736 will be connected to one or more optical sensors, integrated or external to the VCU 108. Thus, a camera system can send photos or videos of the inside or outside of the truck automatically or on demand. The VCU 108 could send pictures or videos of external cameras for checking traffic conditions, weather, location of the truck and trailers, surveillance and others. Another implementation for example, can take video images to provide the driver an easy way for alignment with the trailer while reversing the truck to hook up the trailer. It is also possible to use video images to facilitate parking the truck and the trailer in parking or loading/unloading areas.

The trailer sensor connection subsystem 738 can monitor the physical, electrical and electronic connection between each trailer and the tow/transportation vehicle. The safety of transporting one or more trailers can depend on the reliability of locks and trailer hitches that keep the trailers together as well as couplers and locks to secure the trailers to the truck chassis. In some implementations, sensors and actuators may be used to establish the connection status of hooks used to secure the trailer to the truck chassis.

When the trailer is electrically connected to the truck, it is possible to establish whether the actuators and couplers were properly engaged. It is understood that if it is possible to read the status of the actuators, the electrical connection is also working. In some cases, if the vehicle interconnection interface 726 is able to communicate with the VCU 108 through the wired links, then that electrical and communication systems can be considered "working" (e.g., properly functioning). If any connection fails at physical, electrical or electronic levels, the truck communications interface detects and sends the corresponding alarm to the truck through the VCU 108 to correct the problem.

The input/output subsystem 746 may include a touch screen controller 748 and/or an input controller 750. The touch screen controller 748 may be coupled to the touch screen 744. The touch screen 744 with touch screen controller 748 can detect contact, movement or gestures applied to the surface of the touch screen 744 using sensitive technologies to touch including but not limited to: capacitive, resistive, IR (infrared), surface acoustic wave, diverse arrays or matrices of proximity sensors as well as other factors determining one or more points of contact on the touch screen 744 or in the vicinity of 744. Other touchscreen input drivers may be coupled to other control and input devices 742 via one or more keys or buttons, rocker type switches, thumb-wheel, infrared port, USB port or a pointing device such as an electronic pen. The push buttons can also include audio volume control keys for both the speaker 760 and the microphone 761. In some implementations, the VCU 108 along with the audio subsystem 732 and touch screen 744 can record or play audio files and video using formats like MP3, AAC, MPEG, MP4 or any combination thereof.

The memory interface 754 is coupled to memory 758. The memory 758 may include high speed RAM (Random Access Memory) and/or nonvolatile memory using one or more magnetic hard drives, one or more optical storage devices or FLASH memory (e.g., NAND or NOR memory types). The memory 758 may store the operating system 700 as Linux, Unix, OSX, Windows, Android, RTXC, Darwin, IOS or also the VxWorks embedded system. The operating system 700 may include instructions for handling basic system services of the VCU 108 or execute unique hardware related tasks of the VCU 108. In other implementations, the operating system 700 includes only of one core kernel of a standard operating system (e.g., Unix kernel). The memory 758 may store communications instructions 702 to facilitate communication with one or more additional devices, one or more computers, one or more servers, one or more mobile devices.

Communication instructions 702 can be used to select the operating mode or means of communication used by the VCU 108, based on the geographical location obtained by navigation/GPS instructions of the device 712. The memory 758 may store graphical interface instructions GUI 704 to facilitate processing of the graphic interface; sensor operating instructions 706 to facilitate processing related to the sensors and functioning; events storage instructions 708 to facilitate processing storage-related events and operations; electronic messaging instructions 710 to facilitate processing of emails and functioning; navigation/GPS instructions 712 to facilitate processing related to GPS and navigation operation; cameras instructions 714 to facilitate the processing associated with cameras and functioning; the audiovisual processing instructions 716 to facilitate processing related with the audio/video system and functioning; control and route alternatives instructions 718 for trucks and trailers to facilitate processing related to the features and processes described with reference to FIG. 1A, FIG. 1B and its operation; instructions to monitor each locked trailer 720 is aimed to facilitate processing related to communication between the VCU 108 and each trailer TCU and operation.

The memory 758 may also store other software instructions like web video instructions to facilitate the processing associated with video on the web and functioning; electronic commerce instructions to facilitate processing related with electronic commerce and its operation. In some implementations the audiovisual processing instructions 716 are divided into instructions for processing audio and video separately, in order to facilitate the calculations in the processes related to audio and its functions and processes related to video and its functions respectively. Proxy and captive portal server instructions 721 serve to facilitate the processing related to the proxy server and its operation as well as the captive portal and its operation respectively. With the proxy server for example, a person with smart-phone can approach the truck and the VCU 108 to navigate Internet using wireless links between the truck and the user. In turn, the truck is connected to the Internet using another wireless link that bridges the user and the Internet network. The captive portal, for example, can serve to transmit and display local-stored websites to advertise or sell goods, services or post any information related to users who approach the truck and the VCU 108 without accessing the Internet. The content is stored locally in memory 758.

Each of the instructions and applications identified above may correspond to a group of instructions that execute one or more functions described above. These instructions are not necessarily implemented as separate pieces of software or divided into processes or modules. The memory 758 may include or contain additional instructions to those listed in FIG. 7 or may be less instructions related in FIG. 7. In addition, many functions of the VCU 108 may be implemented in hardware or software using one or more signal processors and/or specialized circuits for each application.

Example Relay Station Control Unit —RSCU— Architecture

Figure 8:
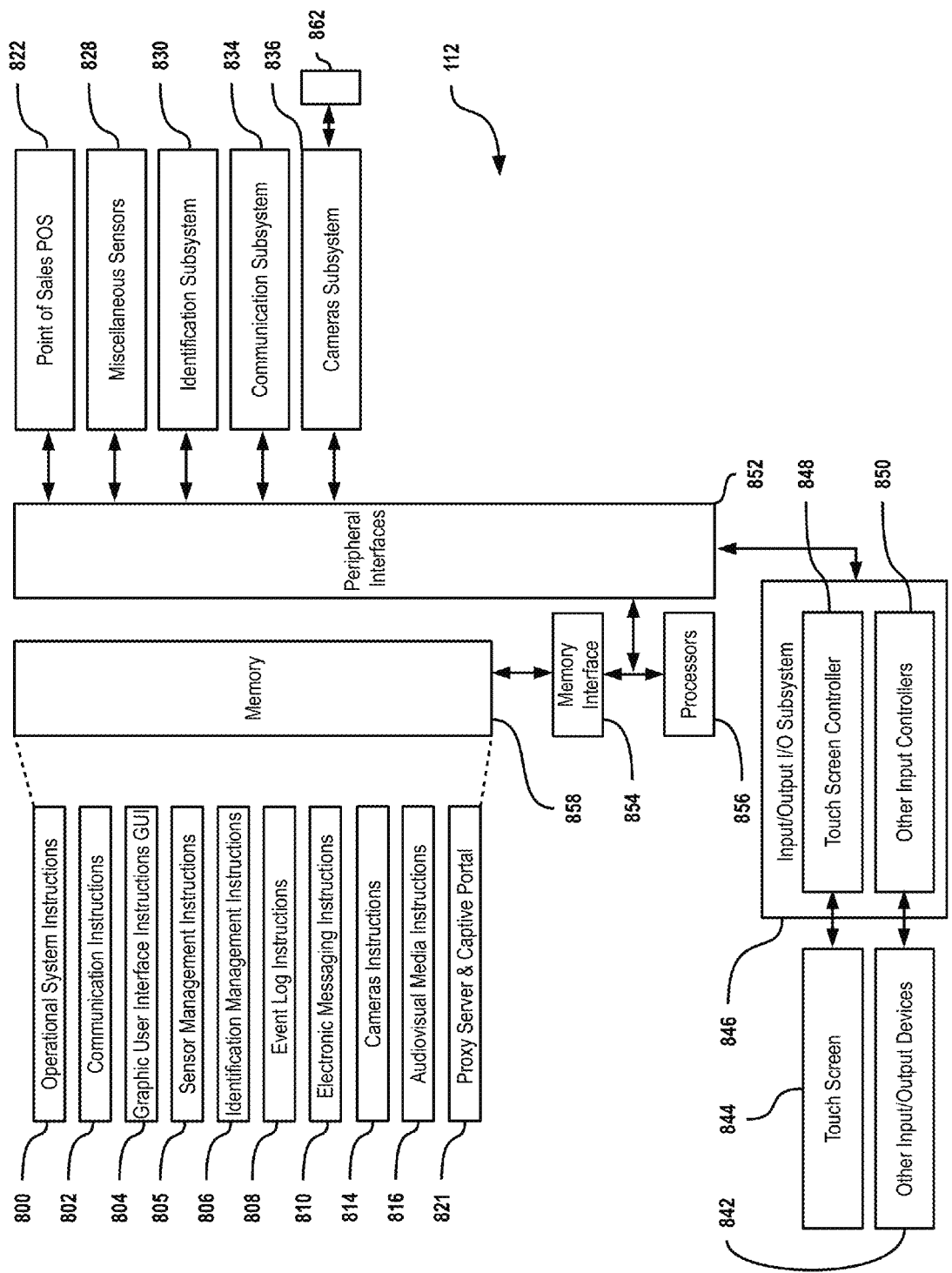
FIG. 8 is a block diagram of an exemplary device architecture of relay station control unit, in accordance with various embodiments.

FIG. 8 is a block diagram of the architecture of the relay station control unit RSCU 112, which enables the implementation of transportation services, warehousing, self-storage and retail sale throughout the coverage area of the service network. The RSCU 112 may include the memory interface 854, one or more central data and/or images processors 856 and the peripheral interfaces 852. The memory interface 854, the core data and/or images processor 856 and the peripheral interface 852 may be separate units or may be grouped in one or more integrated circuits. In turn the different components of the RSCU 112 may be coupled by one or more data buses or communication links. Transducers, sensors, devices and subsystems can be coupled through the peripheral interface 852 to incorporate different features.

The multiplicity of functions or complexity of the RSCU 112 depend on the complexity and size of the relay station, the amount of trailers and cargo volume/handling demands, the level of service required, variety and complexity of services offered, requirements for assembly and installation cost, among other factors. The RSCU 112 can be implemented with more or fewer transducers, more or less sensors, more or less devices, more or less subsystems to suit the needs and type of trailer and cargo-load in particular or transport, storage, distribution and retailing of the service network in general.

For example, the POS (Point of Sales) 822 is coupled to the peripheral interface 852 to facilitate the implementation of functions of settlement and collection of the money to be paid for related services like transportation, self-storage, warehousing and retailing of goods and services stored or transported in trailers. The POS 822 would record payments in different types of modalities (check, credit card, debit card, cash, bitcoins, payments with mobile phones, transfers, EDI payments, etc.) or could also make cash payment for services to drivers or different participating members in the service network. By utilizing the POS 822 it is possible to check available rates of the various services offered locally or where the service network operates. The POS 822 can also enable making reservations of the services offered by the network both locally or anywhere the service network operates.

Various/Miscellaneous sensor interfaces 828 can connect a variety of devices to the peripheral interface 852 including but not limited to: thermometers, humidity sensors, biometric sensors, pressure gauges, magnetometers, or any combination thereof. Thermometers or thermocouples are used to measure the temperature inside the relay station or even monitor the conditions of storage and transportation of temperature-sensitive goods when the cargo or trailers do not have sensors of this nature, but it could be inferred based on the temperature of the relay station especially when trailers are parked near the relay station. Humidity sensors are also used to measure and control when appropriate, the humidity level around the trailers. Biometric sensors are used to control the opening of the accounts used for payments, transfers or cash disbursements and controls the access of sensitive information such as location of trailers, rates, routing schemes, statistics, and other information.

Keeping track and record of operations and operators can enable a high degree of reliability and security of payments services and money transfers. In other implementations, the RSCU 112, via the multiple sensor interface 828, can operate sensors, such as magnetometers, pressure gauges, gas sensors, antennas, among other types of sensors that facilitate measurement. This enables RSCU 112 to implement functions that may need to measure variables related to monitoring and control of the environment in which trailers are stacked or parked and therefore the cargo contained in the aforementioned trailers. Other implementations that can use multiple sensor interface 828 to calibrate the positioning or georeferenced information received by the TCU and the VCU through various positioning systems used by both the trailers and trucks.

The RSCU 112 can include the communication subsystem 834. The communication subsystem 834 can enable the exchange of positioning information and general information among the TCU of the trailers as well as the VCU of the trucks in order to establish the integrity of the measurements stored in these units and their functioning. Depending on the implementation of the navigation/GPS system used by the TCU, the VCU and the RSCU 112 enable to monitor the integrity of the components and inputs that feed these units to generate geographic positions or locations indoors or outdoors. Other implementations may check the integrity of other transducers or sensors which measure various variables within the trailers and trucks. Other implementations may use multiple sensor interface 828 to connect a smartphone or a speaker with microphone for communicating with other members of the service network using voice and data channels used by the TCU, the VCU and the RSCU 112. This enables coordination of different tasks among members of the service network or with the general public.

The identification subsystem 830 can be used to read the labels or identifiers of trailers, tow/transportation vehicles and drivers. Antennas and connections to various wired and wireless ports containing the communication subsystem 834, serve among other things, to communicate with the TCU and the VCU in order to access information identifying each of these devices. Being able to exchange information with the TCU and the VCU can obtain the characteristics of the TCU and the VCU, adding information used to know the unique components that integrate the trucks and trailers passing by or parked in the vicinity of the relay station.

Information such as the MAC address (Media Access Control Address) of the Ethernet ports of the TCU and the VCU, the printed bar-code on the TCU and the VCU printed circuit board, RFID chips attached to the TCU and the VCU, dynamic or static IP addresses (Internet Protocol) taken by the TCU (trailers) and VCU (trucks) at any given moment, unique keys and encrypted codes associated for each truck or trailer, tow/transportation vehicle drivers, the TCU and the VCU event log among other information, creates a unique fingerprint to identify each truck, trailer or driver and thus a number of techniques and technologies to create a unique identity for every single trailer, truck or driver. This can be done to enhance the safety of cargo transport and storage as well as constant monitoring of each trailer and truck across the service area. All identifying information of trailers and trucks and their respective TCU and VCU can be transmitted with or without encryption at any time through the communication subsystem 834 of the RSCU 112. This is done to track trucks, trailers and cargo throughout the service area of the network and check whether the TCU and the VCU have not been altered or changed in trucks or trailers and thus finally determine the identity of truck, drivers and trailers.

The communication functions can be facilitated by one or more communication subsystems 834. The communication subsystem 834 may include one or more wireless communication subsystems or one or more wired communication subsystems. Wireless communication subsystems may include radio frequency receivers and transmitters and/or optical (infrared, laser) receivers and transmitters. The wired communication subsystems may include a serial port device such as USB (Universal Serial Bus), wiring connections to other computing devices such as networking equipment, network access devices, personal computers, printers, flat screens or other devices capable of receiving and transmitting data.

The specific design and implementation of communication subsystem 834 may depend on the communication networks or media on which the RSCU 112 operates. For example, the RSCU 112 may include a wireless communication subsystem designed to operate on a GSM (Global System for Mobile communication) network, an EDGE (Enhance Data GSM Environment) network, 802.X (Wi-Fi, WiMAX or 3G) networks, CDMA (Code Division Multiple Access) networks and Bluetooth networks. The communication subsystem 834 may include protocols for management server or hub-type communication device or hub (hosting protocols) and thus serve as a base station for other wireless devices. Another example would be that the communication subsystem 834 enables the RSCU 112 being synchronized with a network device using one or more protocols such as TCP/IP, HTTP, UDP or other well-known protocols.

The camera subsystem 836 and the optical sensor 862 may be used to facilitate camera functions like taking pictures or videos inside or outside the relay station. The optical sensor 862 includes but is not limited to the use of CCD (Charged Coupled Device) or CMOS (Complementary Metal-Oxide Semiconductor) technologies. Camera subsystem 836 will be connected to more than one optical sensor integrated or external to the RSCU 112. Thus, for example a camera system can send photos or videos of the interior or exterior of the relay station automatically or on demand. The RSCU 112 can send pictures or videos of external cameras for traffic conditions, weather, location of trucks and trailers, video surveillance and others. Another implementation for example, can take video images of the trailers parked in the vicinity of the relay station to monitor or visually confirm whether a trailer or trailers are on the premises of the relay station. Another implementation can use the camera subsystem 836 to indicate trucks arriving at the relay station where to park or unhook trailers in transit or awaiting to be transported to the final destination.

The input/output subsystem 846 may include the touch screen controller 848 and/or the input controller 850. The touch screen controller 848 may be coupled to the touch screen 844. The touch screen 844 with touch screen controller 848 may detect, for example, contact, movement or gestures applied to the surface of the touch screen 844 using touch sensitive technologies including but not limited to: capacitive, resistive, infrared, surface acoustic wave, diverse arrays or matrices of proximity sensors as well as other factors determining one or more points of contact on the touch screen 844 or in the vicinity of touch screen 844.

Other input drivers may be coupled to other control devices and input 842 through one or more keys or buttons, rocker type switches, thumb-wheel, Infrared port, USB port or a pointing device such as an electronic pen. The memory interface 854 is coupled to the memory 858. The memory 858 may include high speed RAM (Random Access Memory) and/or nonvolatile memory using one or more magnetic hard drives, one or more optical storage devices or FLASH memory (e.g., NAND or NOR types of memory). The memory 858 may store the operating system 800 as: Linux, Unix, OSX, Windows, Android, RTXC, Darwin, IOS or also the VxWorks embedded system. The operating system 800 may include instructions for handling basic system services of the RSCU 112 or run exclusive tasks of hardware of the RSCU 112.

In other implementations, the operating system 800 includes a kernel or core of a standard operating system (e.g., Unix kernel). The memory 858 may store communications instructions 802 to facilitate communication with one or more additional devices, one or more computers, one or more servers, one or more mobile devices. The communications instructions 802 can be used to select the operating mode or communication media to use for the RSCU 112, based on communications technologies used by the trucks and trailers which are passing by or parking at the relay station. The memory 858 may store graphical interface instructions GUI 804 to facilitate processing of the graphic interface; sensor operating instructions 805 to facilitate processing related to the sensors and functioning; the instructions of the identification system 806 to facilitate processing related to the identification system and its operation; storage instructions events 808 to facilitate processing storage-related events and operations; electronic mailing instructions 810 to facilitate processing of electronic messaging and functioning; cameras instructions 814 to facilitate the processing associated with cameras and functioning; the audiovisual processing instructions 816 to facilitate processing related to the audio/video system and functioning. The memory 858 may also store other software instructions as web video instructions to facilitate the processing associated with video on the web and functioning; electronic commerce instructions to facilitate processing related with electronic commerce and its operation.

In some implementations the audiovisual processing instructions 816 are divided into instructions for processing audio and video separately, in order to facilitate the calculations in the processes related to audio and its functions and processes related to video and its functions respectively. The proxy server instructions and captive portal 821 serve to facilitate the processing related to the proxy server and its operation as well as the captive portal and its operation respectively. With the proxy server for example, a person with smart-phone can approach the relay station and the RSCU 112 to navigate through Internet using wireless links between the relay station and the user. In turn, relay station connects to the Internet using another wireless link that bridges the user and the Internet network.

The captive portal, for example, can serve to transmit locally stored websites that advertise and/or sell goods and services, provide information related to users who are approaching the relay station and the RSCU 112 without accessing the Internet. The content is stored locally in memory 858. Each of the instructions and applications identified above may correspond to a group of instructions that execute one or more functions described above. These instructions are not necessarily implemented as separate pieces of software or divided into processes or modules. Memory 858 may include or contain additional instructions related to the FIG. 8 or can have less instructions related the FIG. 8. Also, many functions of the RSCU 112 may be implemented in hardware or software using one or more signal processors and/or specialized circuits for each application.

Functional components (e.g., engines, control units, modules, and databases) in this disclosure can be implemented as circuitry, firmware, software, or other functional instructions. For example, the functional components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, enabling data accessed or modified by one functional component to be accessed in another functional component. In some embodiments, at least some of the functional components can be upgraded or modified remotely (e.g., by reconfiguring executable instructions that implements a portion of the functional components). The systems, engines, or devices described may include additional, fewer, or different functional components for various applications.

Example Transportation Process Using the Elements of the Service Network.

Figure 9:
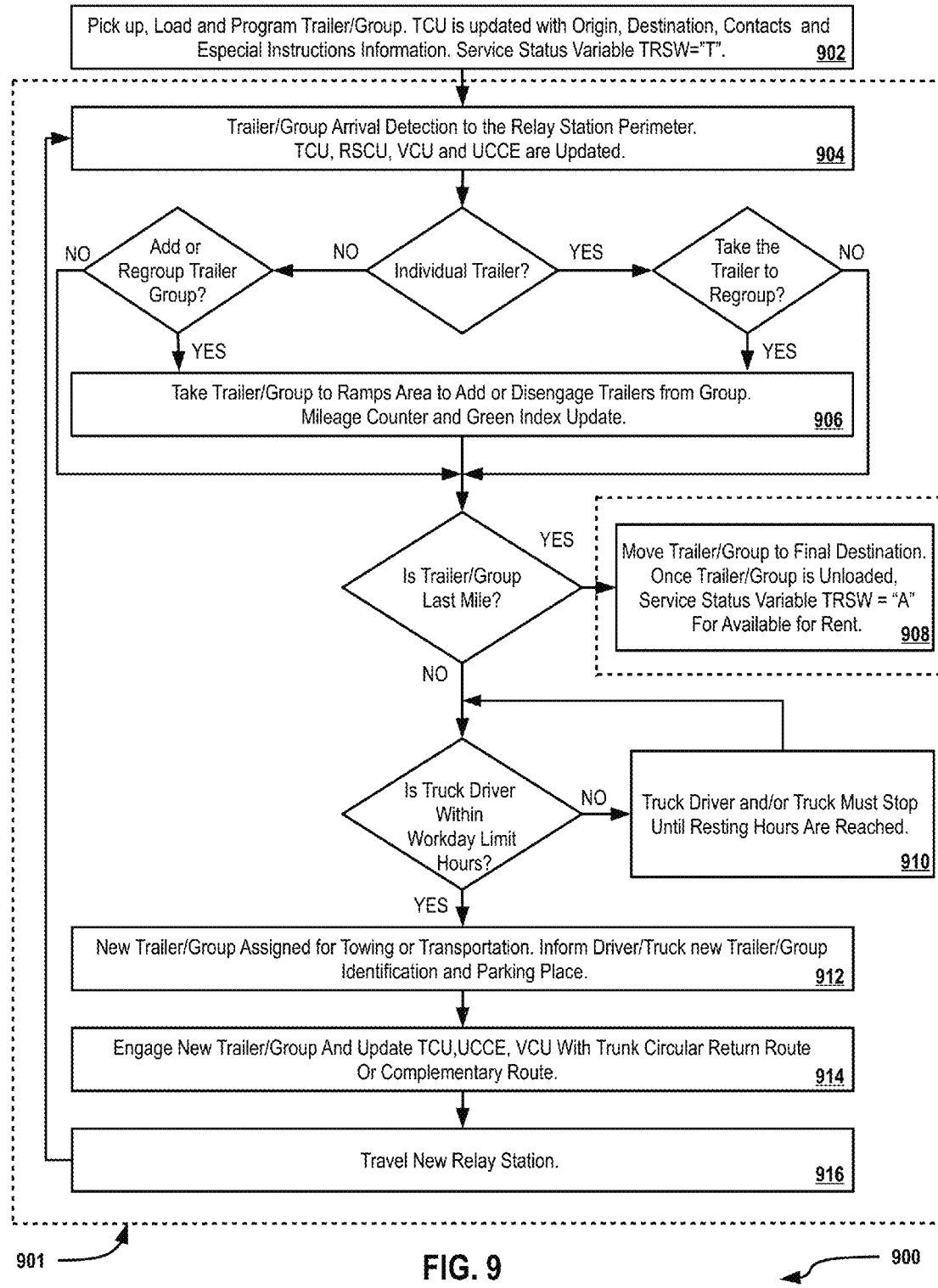
FIG. 9 is a flow diagram of an exemplary process for transporting goods and services using trailer/container, in accordance with various embodiments.

FIG. 9 is the flowchart of the transportation process 900 using the elements of the service network. The process 900 is based on what is described in FIG. 1A and FIG. 1B. In some implementations, the process 900 can start with the use of trailers 100a, 100b, 100c, 100d and 100e for loading merchandise or goods to be transported and tow/transportation vehicles 110a, 110b, 110c, 110d, 110e and 110f that are responsible for moving the aforementioned trailers (FIG. 1A).

Then the tow/transportation vehicles pick up an empty trailer and take it to the premises where the cargo-load is located. Then the cargo is loaded inside the trailer so the trailer or group of trailers (trailers/group from now on) are ready to be programmed and used for transportation 902. The TCU takes values containing information about origin, destination, contacts both on the origin and destination place as well as special instructions for cargo transportation and handling. The status variable TRSW takes the value "T" corresponding to transportation 902.

The tow/transportation vehicle takes the trailer from the origin (cargo pick-up place) and carries it to the nearest relay station. Once there, the arrival of both the tow/transportation vehicle and the trailer is detected since these components are on the perimeter of the relay station. Control units are updated 904 like the TCU, the RSCU, the UCCE (general information control service 516, see FIG. 5) and the VCU. Now by checking the tow/transportation vehicle see if a trailer or a group of trailers are attached. If an individual trailer is coming and has to be grouped or a coming group of trailers have to be regrouped, added or disengaged in one or more trailers, then the tow/transportation truck and trailer are taken to a parking area 200 (e.g., a regrouping area). There, the trailer/group goes over ramps 204 (FIG. 2) where trailers are added or disengaged from a group.

When configuring the new group of trailers, the accumulator of miles traveled is updated including green miles 906. Green miles traveled are those when the trailer/group of trailers is pulled by trucks using renewable and environmentally friendly fuels. In some cases these trucks receive government subsidies for using fuels without adverse effects on the environment 906. Once the trailer/group is disengaged or regrouped, it is checked whether the trailer/group must be transported to the final destination, namely, the current relay station is the last station before reaching the final destination. If the current station is the last relay station, the trailer/group moves to final destination.

When the trailer/group is unloaded, the TRSW status variable takes the value of "A" corresponding to A=Available or trailer/group ready to be rented or available for use 908. If the relay station does not correspond to the last station before reaching the final destination, then it is checked whether the driver transporting the trailer/group is driving within the limits of maximum hours per day allowed. The driver and/or truck should be immobilized to accumulate hours of rest if the driver exceeds the hours of operation 910. If the driver is still working within maximum limit of working hours then a new trailer/group is assigned to engage and transport.

The truck driver is notified about the trailer identification and parking location where to hook the trailer/group 912. When the new trailer/group is engaged the TCU, the UCCE (FIG. 5) and the VCU are updated with the new circular-return trunk route or complementary route 914. After setting the new route, the truck and the trailer/group are moved to the new relay station 916. Once a trailer and its transporting vehicle get to the new relay station, the process is repeated 904 until the trailer/group reaches the last relay station 908.

When the trailer/group moves along the trunks from relay station to relay station, the process is repeated again and again from step 904, 912, 914 and 916 until the trailer/group reaches the last relay station 908. The set of processes and instructions that are repeated until the trailer/group moves to last relay station, are grouped in the 901 instruction set.

Example Warehousing Process Using the Elements of Network Services.

Figure 10:
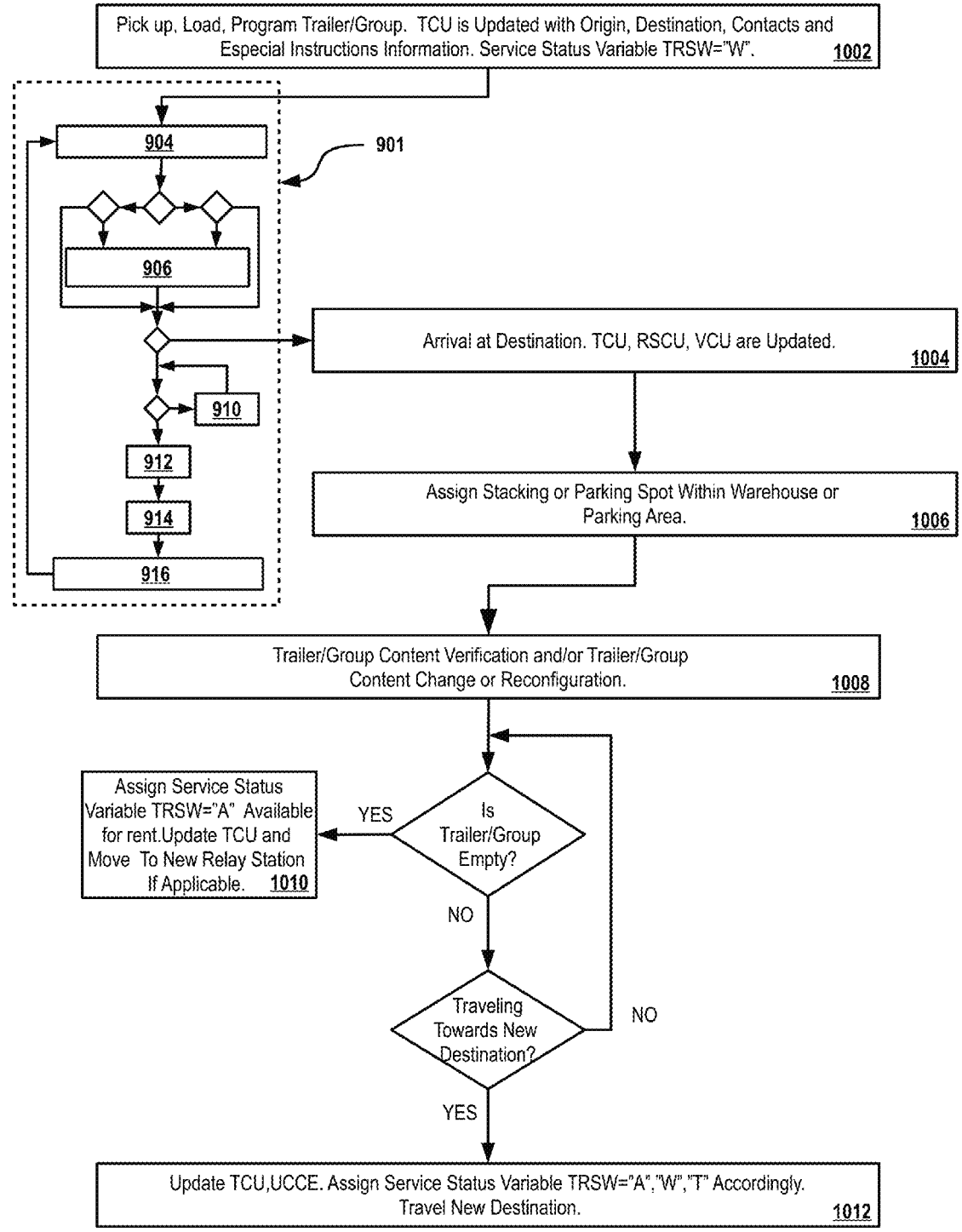
FIG. 10 is a flow diagram of an exemplary process for warehousing of goods and services using trailer/container, in accordance with various embodiments.

FIG. 10 is the flowchart of the warehousing process 1000 using the elements of the service network. The process 1000 is based on what is described in FIG. 1A, FIG. 1B and FIG. 4. In some implementations, the process 1000 may begin with the use of the trailers 100*a*, 100*b*, 100*c*, 100*d* and 100*e* for loading the merchandise, goods or services to be transported and stored (FIG. 1A). Also the tow/transportation vehicles 110*a*, 110*b*, 110*c*, 110*d*, 110*e* and 110*f* which are responsible for moving the trailers (FIG. 1A) are involved. Then the tow/transportation vehicles pick up empty trailers, move them to the premises where the cargo is located, deposit the cargo inside the trailer and the trailer TCU is programmed with the origin-destination information, contacts at origin-destination and special instructions for cargo transportation and handling. The TRSW status variable takes the value of "W" for Warehousing 1002.

Once the trailer/group is loaded and programmed, it is taken to a relay station where it is deposited and then being transported along trunks up to reaching the last relay station before getting the final destination. To do that, follow the steps and processes illustrated in FIG. 9, in particular the steps grouped in sub-process 901.

The sub-process 901 functions as a loop which is a repeated process which is running again and again until the trailer/group reaches the final destination. Sub-process 901 can a recursive process in view that is repeated again and again, until the termination condition of the loop occurs. In the case of the sub-process 901, the termination of the loop occurs when the trailer/group reaches the last relay station and moves from there to the final destination. On arrival at the final destination, the TCU, the RSCU and the VCU are updated 1004.

Once the final destination is reached, the stacking or parking area is assigned (FIG. 4) which is located inside of the storage or warehousing area 1006. Once the trailer/group is located within the storage area, the contents of the trailer/group is checked to reconfigure the content of the trailer/group 1008. In some implementations once the trailer/group becomes empty, TRSW service status variable takes the value "A" (Available) so the trailer can be rented. The TCU is updated and the trailer/group is moved to a relay station for reuse 1010.

If the trailer/group still has goods or cargo, then it is checked whether to move to another destination or still parked in the area of warehousing. If the trailer/group, in spite of having goods and property, requires that the trailer/group moves to another destination, then the TCU and the UCCE are updated. TRSW service status variable can take any value as: "A" (Available), "W" (Warehousing), "T" (Transport) as appropriate and then trailer/group is going to another destination 1012.

Example Self-Storage Process Using the Elements of the Service Network.

Figure 11:
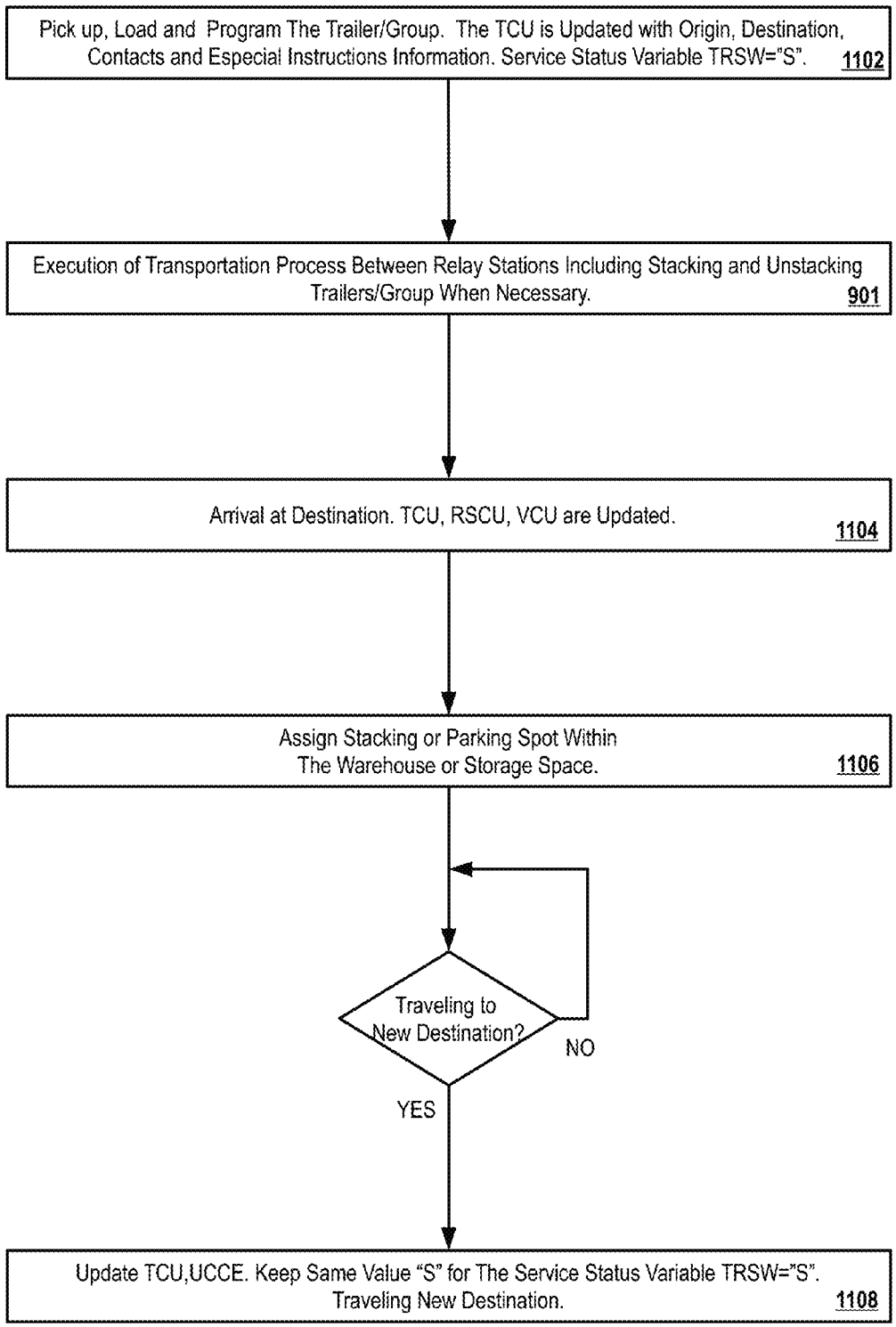
FIG. 11 is a flow diagram of an exemplary process for self-storage of goods and services using trailer/container, in accordance with various embodiments.

FIG. 11 is a flowchart of self-storage process 1100 and the way the elements of the network services are used. The process 1100 is based on what is described on FIG. 1A, FIG. 1B and FIG. 4. In some implementations, the process 1100 may begin with the use of the trailers 100*a*, 100*b*, 100*c*, 100*d* and 100*e* to load the cargo, goods or services for storage (FIG. 1A). Also the tow/transportation vehicles like 110*a*, 110*b*, 110*c*, 110*d*, 110*e* and 110*f* are involved, which are responsible for moving the trailers mentioned above (FIG. 1A). So, the tow/transportation vehicle picks up the empty trailers and moved them to the premises where the cargo is located. The cargo is loaded and the trailer/group is set up with information like origin, destination, contact information and special instructions that are stored digitally on the TCU. The TRSW service status variable takes the value of "S" (Storage) 1102.

Once the trailer/group is loaded, the transportation process starts when trailers are shipped between relay stations and sometimes stacking or regrouping trailer/group when necessary 901. Upon arrival at the final destination, the TCU, the VCU and the RSCU are updated 1104. Then the stacking or parking area within the warehouse or storage area is assigned 1106. Once the trailer/group is parked or stacked up, it is necessary to assess whether to leave for a new destination with the cargo, goods or services stored inside of the trailer/group. If it is necessary to depart to a new destination, then the TCU and the UCCE are updated. The TRSW service status variable is maintained with the "S" (Storage) value and the trailer/group is moved to the new destination 1108.

Example Retail Process Using Elements of the Service Network.

Figure 12:
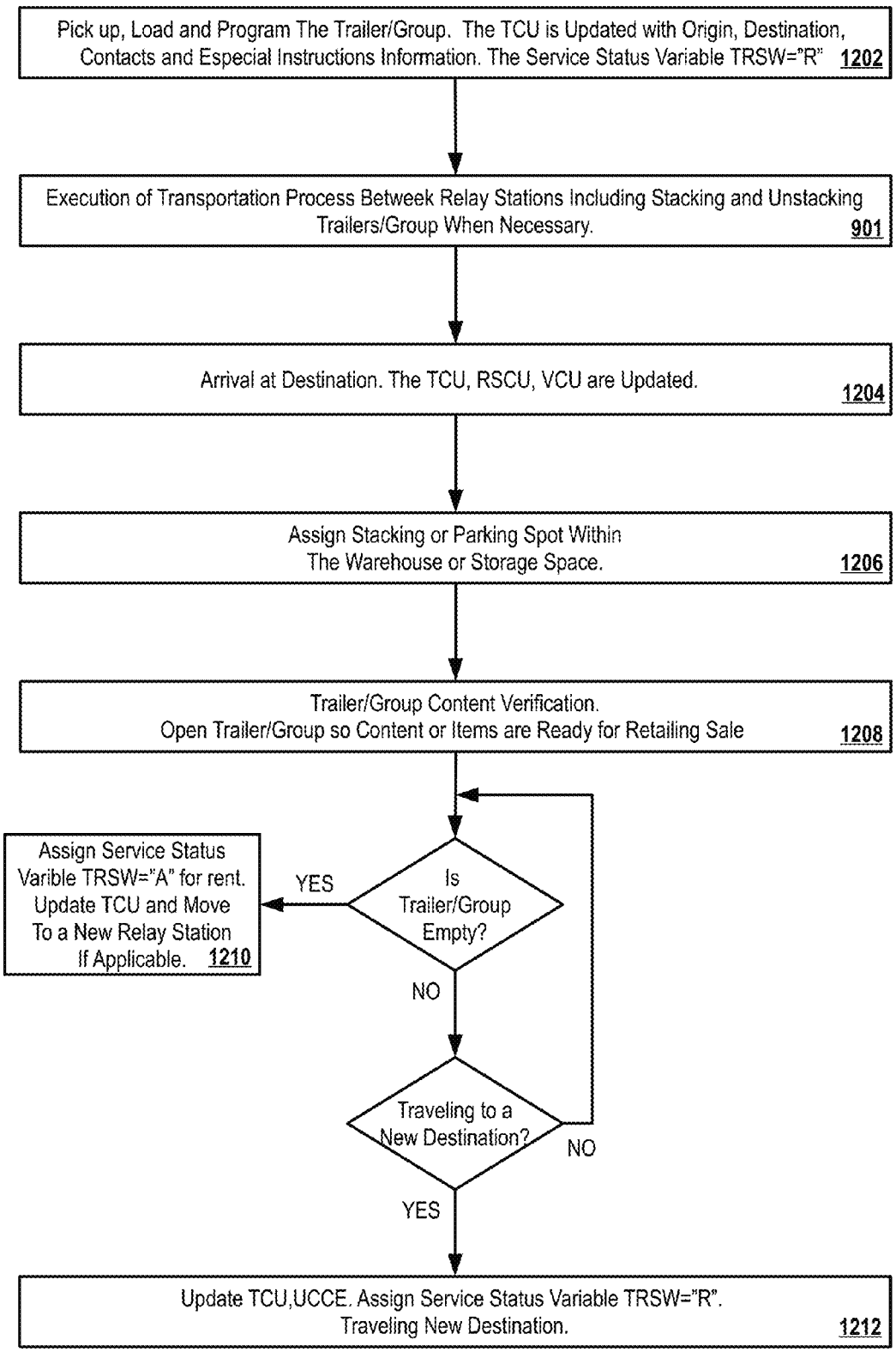
FIG. 12 is a flow diagram of an exemplary process for retailing using trailer/container, in accordance with various embodiments.

FIG. 12 is the flowchart of the retail process 1200 which uses the elements of the service network. The process 1200 is based on what FIG. 1A, FIG. 1B and FIG. 4 are describing. In some implementations, the process 1200 may begin with the use of the trailers 100a, 100b, 100c, 100d and 100e to load the cargo, goods or services for transportation and retailing (FIG. 1A). Also the tow/transportation vehicles 110a, 110b, 110c, 110d, 110e and 110f can be involved and can be responsible for moving the trailers mentioned above (FIG. 1A). So, the tow/transportation trucks pick up the empty trailers and then move to the premises where goods, products or services are located for sale. Goods or services are loaded inside of the trailer/group and the TCU is programmed with information like origin, destination, contact information and special instructions. The TRSW service status variable is updated with the "R" (Retail) value 1202. Once the trailer/group is loaded, the transportation process starts when trailers are shipped between relay stations and sometimes stacking and regrouping the trailer/group when necessary 901. Upon arrival at the final destination, the TCU, the VCU, the RSCU are updated 1204.

At destination, the stacking and parking area is allocated within the warehouse or storage area for retailing 1206. Inventory of the trailer/group content is verified so when open, the items or services are disposed for starting the retailing operation 1208. The trailer/group may contain a vending machine so an automated sale is implemented or you can arrange the contents of the trailers for self-assisted sale. Once the trailer/group is ready in the parking or stacking area, the goods or services are disposed for sale, meanwhile, it is constantly assessing whether the contents of the trailer/group is empty. If all goods, products or services are sold and the trailer/group is empty, then the TRSW service status variable takes the value "A" (Available) and the trailer/group is ready for renting. The trailer/group TCU is updated and the trailer/group is moved to a relay station if necessary 1210.

If the trailer/group still has goods, products or services, evaluate whether to close the trailer/group for leaving to a new destination. If there are still goods or services inside the trailer/group and a new destination is assigned, then the TCU and the UCCE are updated so the TRSW service status variable takes the value "R" (Retailing) and the service network proceeds to move the trailer/group to a new destination 1212.

While processes or blocks are presented in this disclosure, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Some embodiments of the disclosure have other aspects, elements, features, and steps in addition to or in place of what is described above. These potential additions and replacements are described throughout the rest of the specification. Reference in this specification to "various embodiments," several embodiments, or "some embodiments" means that a particular feature, structure, or characteristic described in connection with the embodiment is included in at least one embodiment of the disclosure. These embodiments, even alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments.

In several embodiments, the routing, grouping, and/or labeling performed by the transportation system can be performed by at least a processor of a computer server specifically configured by executable instructions (e.g., stored in a computer readable memory component) in accordance with the processes and methods described above.

What is claimed is:

1. A method comprising:
    identifying a logistic request to transport, store, and/or distribute a cargo load comprising one or more physical items;
    identifying a network address of a cargo container in a transportation network address space, wherein the transportation network address space includes one or more networks and one or more relay terminals;
    associating the logistic request for the cargo load with the network address of the cargo container;
    recording, to a computer server, a division of the cargo load into two or more cargo portions associated with one or more cargo containers including the cargo container, wherein the division of the cargo load is dictated in the logistic request; and
    monitoring geographical information and chain of custody information of the cargo load.

2. The method of claim 1, wherein identifying the logistic request includes receiving the logistic request via at least one of: a web portal, a mobile application, an interface of a trailer control unit, an interface or a vehicle control unit, or an interface of a relay station control unit.

3. The method of claim 1, wherein identifying the network address of the cargo container includes scanning a passive label on the cargo container.

4. The method of claim 1, wherein identifying the network address of the cargo container includes electronically receiving the network address from a trailer control unit of the cargo container.

5. The method of claim 1, further comprising identifying a location of a relay station to deposit the physical items into one or more cargo containers.

6. The method of claim 5, wherein identifying the network address of the cargo container includes determining which of one or more cargo containers in the relay station is available or has available space for at least a portion of the cargo load.

7. A computer server comprising:
    a processor;
    data storage memory storing executable instructions to configure the processor, which when configured, is operable to implement a process that comprises:
        maintaining an association between a cargo load and a logistic request;
        maintaining an address space of one or more nodes associated with one or more transportation, distribution, or storage terminals;
        receiving geolocation updates from one or more control units of the nodes directly or indirectly;
        tracking one or more activities associated with moving at least a portion of the cargo load to a node in the address space;
        recording a division of the cargo load into two or more cargo portions associated with one or more cargo containers including the cargo container, wherein the division of the cargo load is dictated in the logistic request; and monitoring a location of the portion of the cargo load by matching the activities with the geolocation updates.

8. The computer server of claim 7, wherein the process further comprises dynamically routing the portion of the cargo load to a final destination indicated in the logistic request according to a routing protocol.

9. The computer server of claim 7, wherein the process further comprises receiving a routing update associated with a transportation node in the address space.

10. The computer server of claim 7, wherein the process further comprises:

receiving the logistic request from a requesting user associated with a requesting device; and in response to receiving the logistic request, providing a cryptographic key to the requesting device, wherein the cryptographic key is capable of authorizing tracking of the location of the cargo load.

11. The computer server of claim 7, wherein the process further comprises:

receiving the logistic request from a requesting user associated with a requesting device; and in response to receiving the logistic request, providing a node location associated with one of the nodes in the address space to deposit the cargo load.

12. The computer server of claim 7, wherein the logistic request includes at least one of: an origin address, a destination address, an instruction for handling the cargo load, or a preferred shipping company.

13. A cargo container comprising:

a chassis to hold cargo load;

a passive label capable of identifying the cargo container as a node in a network address space for transporting physical goods;

a trailer control unit (TCU) capable of tracking at least one of: a geographic location of the TCU, identifier of the cargo load, destination of the cargo load, or log information of activity associated therewith; and a network port to communicate with a device outside of the cargo container wherein the TCU and the network port are configured to record, with the device, a division of the cargo load into two or more cargo portions associated with one or more cargo containers including the cargo container.

14. The cargo container of claim 13, wherein the network port is configured to communicate with a peer-to-peer device including a mobile device in a wireless vicinity or line of sight vicinity of the cargo container.

15. The cargo container of claim 14, wherein the TCU is capable of communicating with a mobile device to define cargo related settings.

16. The cargo container of claim 15, wherein the cargo related settings include at least one of: cargo origin, cargo destination, cargo weight, cargo density, delivery priority, hazmat warning, shipper contact info, recipient contact info, cargo handling instructions, transportation service option, or self-storage option.

17. The cargo container of claim 13, wherein the network port is configured to communicate with a wide area network (WAN) and/or the Internet.

18. The cargo container of claim 13, wherein the network port is configured to communicate with a vehicle control unit (VCU) of a vehicle carrying the cargo container, wherein the TCU is configured to provide data associated with the cargo load to the VCU.

19. The cargo container of claim 13, wherein the TCU is capable of identifying the cargo container separate from the passive label.

20. The cargo container of claim 13, further comprising a dispenser to distribute at least a portion of the physical goods automatically from the cargo container.

21. The cargo container of claim 13, further comprising a geo-location device configured to monitor a navigation attribute of the cargo container; and wherein the geo-location device is configured to report the navigation attribute to the TCU; wherein the navigation attribute includes at least one of: geolocation, speed, or velocity.

22. The cargo container of claim 21, wherein, based on the navigation attribute, the TCU is configured to track progress to a next node in the network address space to exchange the cargo load.

23. The cargo container of claim 21, wherein the geo-location device includes at least one of: a global positioning system (GPS), an inertial navigation system, or a radio triangulation device.

24. A computer readable data storage memory storing computer-executable instructions that, when executed, cause a computer system to perform a computer-implemented method, the instructions comprising:

instructions for identifying a logistic request associated with a cargo load including a destination address of where to deliver the cargo load;

instructions for identifying an immediate relay terminal closest to a cargo load associated with the logistic request;

instructions for determining a next node to carry the cargo load based on a network topology of a transportation node network comprising two or more relay terminals based on route delay information associated with one or more of the relay terminals;

instructions for, when the destination address is beyond a threshold distance from the immediate relay terminal, generating a trunk route from the immediate relay terminal to the destination address, wherein the trunk route includes a destination and a direction without street-level routing; and instructions for assigning the cargo load to a transportation vehicle destined for the next relay terminal.

25. The computer readable data storage memory of claim 24, wherein the instructions further comprise instructions for determining whether the destination address is within a threshold distance; and wherein determining the next node includes selecting the destination address as the next node when the destination address is within the threshold distance.

26. The computer readable data storage memory of claim 25, wherein, when the destination address is within the threshold distance from the immediate relay terminal, the instructions further comprises instructions for generating a last mile route from the immediate relay terminal to the destination address, wherein the last mile route includes street-level routing.

27. The computer readable data storage memory of claim 24, wherein, when a distance from the immediate relay terminal to the next node is above a threshold distance, the instructions further comprises instructions for grouping a cargo trailer associated with the cargo load with at least another cargo trailer with other cargo load.

28. The computer readable data storage memory of claim 24, wherein the instructions further comprise instructions for assigning the transportation vehicle in a circular route from the immediate relay terminal closest to the cargo load to the next node and back.

29. The computer readable data storage memory of claim 28, wherein the instructions further comprise instructions for computing a maximum route length of the circular route based on vehicle speed and length of a contracted workday of a driver.

30. The computer readable data storage memory of claim 24, wherein the next node is a next relay terminal; and wherein the route delay information includes at least one of: bandwidth at the next relay terminal to process cargo, weather information between the immediate relay terminal and the next relay terminal, traffic information from the immediate relay terminal to the next relay terminal, or availability of one or more transportation vehicles from the immediate relay terminal to the next relay terminal.

* * * * *